(12) United States Patent
Kim et al.

(10) Patent No.: US 8,542,571 B2
(45) Date of Patent: Sep. 24, 2013

(54) CELL SEARCH METHOD, FORWARD LINK FRAME TRANSMISSION METHOD, APPARATUS USING THE SAME AND FORWARD LINK FRAME STRUCTURE

(75) Inventors: Il-Gyu Kim, Choongcheongbuk-do (KR); Hyeong-Geun Park, Daejeon (KR); Nam-Il Kim, Daejeon (KR); Kap-Seok Chang, Daejeon (KR); Young-Hoon Kim, Daejeon (KR); Seung-Chan Bang, Daejeon (KR)

(73) Assignees: Electronics and Telecommunications Research Institute, Daejeon (KR); KT Corporation, Seongnam-Si, Gyeonggi-Do (KR); SK Telecom., Co., Ltd, Seoul (KR)

( * ) Notice: Subject to any disclaimer, the term of this patent is extended or adjusted under 35 U.S.C. 154(b) by 927 days.

(21) Appl. No.: 12/093,284

(22) PCT Filed: Nov. 10, 2006

(86) PCT No.: PCT/KR2006/004692
§ 371 (c)(1),
(2), (4) Date: Oct. 24, 2008

(87) PCT Pub. No.: WO2007/055526
PCT Pub. Date: May 18, 2007

(65) Prior Publication Data
US 2009/0219882 A1 Sep. 3, 2009

(30) Foreign Application Priority Data

Nov. 10, 2005 (KR) .................. 10-2005-0107474
Aug. 7, 2006 (KR) .................. 10-2006-0074308

(51) Int. Cl.
*H04L 27/30* (2006.01)

(52) U.S. Cl.
USPC ............................................ 370/208; 370/252

(58) Field of Classification Search
USPC ................. 370/203, 208–210, 252, 254, 255, 370/389, 509–514, 328, 336, 338, 343–345; 380/208–209, 239
See application file for complete search history.

(56) References Cited

U.S. PATENT DOCUMENTS

2002/0034944 A1* 3/2002 Tanno et al. .................. 455/434
2005/0157637 A1* 7/2005 Feng et al. .................... 370/203

OTHER PUBLICATIONS

International Search Report for PCT/KR2006/004692 dated Feb. 13, 2007.

(Continued)

*Primary Examiner* — Donald Mills
*Assistant Examiner* — Mon Cheri Davenport
(74) *Attorney, Agent, or Firm* — Kile Park Reed & Houtteman PLLC

(57) ABSTRACT

Provided are a cell search method, a forward link frame transmission method, an apparatus using the methods, and a forward link frame structure. The cell search apparatus includes a sync acquirer acquiring synchronization of sync channel symbols using a sync channel of a forward link, and a group detector detecting at least one hopping codeword element belonging to a hopping codeword of a target cell from a forward link signal containing sync channel symbols sequence-hopped using a hopping codeword corresponding to a code group to which a scrambling code of each cell belongs based on the acquired synchronization, and detecting a code group of the target cell based on the detected hopping codeword element, wherein the hopping codewords are orthogonal to a cyclic shift operation. Accordingly, a cell search time and the complexity of the cell search can be reduced.

28 Claims, 19 Drawing Sheets

(56) References Cited

OTHER PUBLICATIONS

Written Opinion for PCT/KR2006/004692 dated Feb. 13, 2007.
Jung-Hyun Choi et al., "A Fast Cell Search Algorithm using Code Block CPM in Asynchronous W-CDMA system", Vehicular Technology Conference 2000, IEEE VTS Fall VTC 2000, 52nd Sep. 24-28, 2000, Piscataway, NJ, USA, IEEE, vol. 1, Sep. 24, 2000, pp. 280-285.
Etri: "Cell Search Scheme for EUTRA & TP", 3GPP Draft; R1-060072, 3RD Generation Partnership Project (3GPP), Mobile Competence Centre, 650, Route Des Lucioles, F-06921 Sophia-Antipolis Cedex, France, vol. RAN WG1, Jan. 18, 2006.

* cited by examiner

CELL SEARCH METHOD, FORWARD LINK FRAME TRANSMISSION METHOD, APPARATUS USING THE SAME AND FORWARD LINK FRAME STRUCTURE

CROSS-REFERENCE TO RELATED PATENT APPLICATION

This application claims the benefit of Korean Patent Application Nos. 10-2005-0107474 and 10-2006-0074308, respectively filed on Nov. 10, 2005 and Aug. 7, 2006, in the Korean Intellectual Property Office, the disclosures of which are incorporated herein by reference.

BACKGROUND OF THE INVENTION

1. Field of the Invention

The present invention relates to an Orthogonal Frequency Division Multiplexing (OFDM) cellular system, and more particularly, to a method of searching for a cell in an OFDM cellular system, a mobile station using the method, a base station using the method, a system using the method, and a frame structure used in the method.

2. Description of the Related Art

In a Wideband Code Division Multiple Access (WCDMA) method of the $3^{rd}$ Generation Partnership Project (3GPP), a cellular system uses a total of 512 long Pseudo-Noise (PN) scrambling codes in order to identify base stations of a forward link, wherein each adjacent base station uses a unique long PN scrambling code as a scrambling code of forward link channels. When a mobile station is turned on, the mobile station must acquire system timing of a base station to which the mobile station belongs (i.e., a base station of which a reception signal has the maximum amplitude) and a long PN scrambling code ID used by the base station. This process is called a mobile station's cell search process.

In WCDMA, in order to easily perform the mobile station's cell search process, the 512 long PN scrambling codes are grouped into 64 groups, and a primary sync channel and a secondary sync channel are included in the forward link. The primary sync channel is used for a mobile station to acquire slot sync, and the secondary sync channel is used for the mobile station to acquire a 10-msec frame boundary and long PN scrambling code group ID information.

The mobile station's cell search process in WCDMA is accomplished in 3 steps. In the first step, a mobile station acquires slot sync using a Primary Scrambling Code (PSC). In WCDMA, the same 15-slot PSC is transmitted every 10 msec, and PSCs transmitted by all base stations are the same signal. In the first step, slot sync is acquired using a matching filter suitable for the PSC.

In the second step, long PN scrambling code group ID information and a 10-msec frame boundary are acquired using the slot timing information acquired in the first step and a Secondary Scrambling Code (SSC).

In the third step, a long PN scrambling code ID used by a currently connected base station is acquired using the 10-msec frame boundary and the long PN scrambling code group ID information that were acquired in the second step and a common pilot channel code correlator. That is, since 8 long PN scrambling codes are mapped to a single code group, the mobile station detects the long PN scrambling code ID used in the current cell on the basis of outputs of the common pilot channel code correlator for 8 long PN scrambling codes corresponding to the long PN scrambling code group ID information.

In WCDMA, a sync channel consists of a primary sync channel and a secondary sync channel, and the primary sync channel, the secondary sync channel, a common pilot channel, and other data channels are multiplexed in a CDMA method based on a time domain direct sequence spread spectrum.

Recently, in the 3GPP, an OFDM-based wireless transmission technology standardization is being established as a part of $3^{rd}$ Generation Long Term Evolution (3G-LTE) to compensate for disadvantages of WCDMA. The sync channel & common pilot channel structure and the mobile station's cell search process used in WCDMA are suitable for Direct Sequence Code Division Multiple Access (DS-CDMA) but cannot be applied to an OFDM forward link. Thus, a forward link sync channel & common pilot channel structure, a mobile station's initial cell search method, and an adjacent cell search method for handover are required in an OFDM cellular system.

SUMMARY OF THE INVENTION

The present invention provides a cell search apparatus and method in an Orthogonal Frequency-Division Multiplexing (OFDM) cellular system.

The present invention also provides a forward link frame transmission apparatus and method for supporting the cell search method.

The present invention also provides an OFDM cellular system to which the cell search method is applied.

The present invention also provides a computer readable recording medium storing a computer readable program for executing the cell search method.

The present invention also provides a structure of a forward link frame used in the cell search method.

According to an aspect of the present invention, there is provided a cell search apparatus in an OFDM cellular system in which a unique scrambling code is assigned to each cell, the cell search apparatus including: a sync acquirer acquiring synchronization of sync channel symbols using a sync channel of a forward link; and a group detector detecting at least one hopping codeword element belonging to a hopping codeword of a target cell from a forward link signal containing sync channel symbols sequence-hopped using a hopping codeword corresponding to a code group to which a scrambling code of each cell belongs based on the acquired synchronization, and detecting a code group of the target cell based on the detected hopping codeword element, wherein the hopping codewords are orthogonal to a cyclic shift operation.

According to another aspect of the present invention, there is provided a cell search apparatus in an OFDM cellular system in which a unique scrambling code is assigned to each cell, the cell search apparatus including: a sync acquirer acquiring synchronization of sync channel symbols using a sync channel of a forward link; and a boundary detector detecting at least one hopping codeword element belonging to a hopping codeword of a target cell from a forward link signal containing sync channel symbols sequence-hopped using a hopping codeword that is orthogonal to a cyclic shift operation for each cell based on the acquired synchronization and detecting a frame boundary of the target cell based on the detected hopping codeword element.

According to another aspect of the present invention, there is provided a forward link frame transmission apparatus of a base station belonging to an OFDM cellular system in which a unique scrambling code is assigned to each cell, the forward link frame transmission apparatus including: a sync channel generator generating sync channel sequences corresponding to elements of a hopping codeword corresponding to a code group to which a scrambling code of a base station belongs; and a frame transmitter performing sequence hopping of each sync channel symbol using each generated sync channel sequence, generating an OFDM symbol-based forward link frame containing the sequence-hopped sync channel symbols, and transmitting the generated forward link frame, wherein hopping codewords used in the system are orthogonal to cyclic shift.

According to another aspect of the present invention, there is provided an OFDM cellular system including a mobile station and a plurality of base stations, and in which a unique scrambling code is assigned to each cell, each of the plurality of base stations including: a sync channel generator generating a hopping codeword corresponding to a code group to which a scrambling code of the base station belongs and generating sync channel sequences corresponding to elements of the generated hopping codeword; and a frame transmitter performing sequence hopping of each sync channel symbol using each generated sync channel sequence, generating an OFDM symbol-based forward link frame containing the sequence-hopped sync channel symbols, and transmitting the generated forward link frame, and the mobile station including: a sync acquirer acquiring synchronization of sync channel symbols using a sync channel of a forward link; and a group detector detecting at least one hopping codeword element belonging to a hopping codeword of a target cell from a forward link signal containing sync channel symbols sequence-hopped using a hopping codeword of each cell based on the acquired synchronization and detecting a code group of the target cell based on the detected hopping codeword, wherein the hopping codewords are orthogonal to a cyclic shift operation.

According to another aspect of the present invention, there is provided a cell search method in an OFDM cellular system in which a unique scrambling code is assigned to each cell, the cell search method including: (a) acquiring synchronization sync channel symbols using a sync channel of a forward link; and (b) detecting at least one hopping codeword element belonging to a hopping codeword of a target cell from a forward link signal containing sync channel symbols sequence-hopped using a hopping codeword corresponding to a code group to which a scrambling code of each cell belongs based on the acquired synchronization, and detecting a code group of the target cell based on the detected hopping codeword element, wherein the hopping codewords are orthogonal to a cyclic shift operation.

According to another aspect of the present invention, there is provided a cell search method in an OFDM cellular system in which a unique scrambling code is assigned to each cell, the cell search method including: (a) acquiring synchronization of sync channel symbols using a sync channel of a forward link; and (b) detecting at least one hopping codeword element belonging to a hopping codeword of a target cell from a forward link signal containing sync channel symbols sequence-hopped using a hopping codeword that is orthogonal to a cyclic shift operation for each cell based on the acquired synchronization, and detecting a frame boundary of the target cell based on the detected hopping codeword element.

According to another aspect of the present invention, there is provided a forward link frame transmission method of a base station belonging to an OFDM cellular system in which a unique scrambling code is assigned to each cell, the forward link frame transmission method including: (a) generating a hopping codeword corresponding to a code group to which a scrambling code of the base station belongs, and generating sync channel sequences corresponding to elements of the generated hopping codeword; and (b) performing sequence hopping of each sync channel symbol using each generated sync channel sequence, generating an OFDM symbol-based forward link frame containing the sequence-hopped sync channel symbols, and transmitting the generated forward link frame, wherein the hopping codewords are orthogonal to a cyclic shift operation.

According to another aspect of the present invention, there is provided a structure of a forward link frame in an OFDM cellular system in which a unique scrambling code is assigned to each cell, the forward link frame including sync channel symbols sequence-hopped using sync channel sequences corresponding to elements of a hopping codeword corresponding to a code group to which a scrambling code belongs, wherein the hopping codewords are orthogonal to a cyclic shift operation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
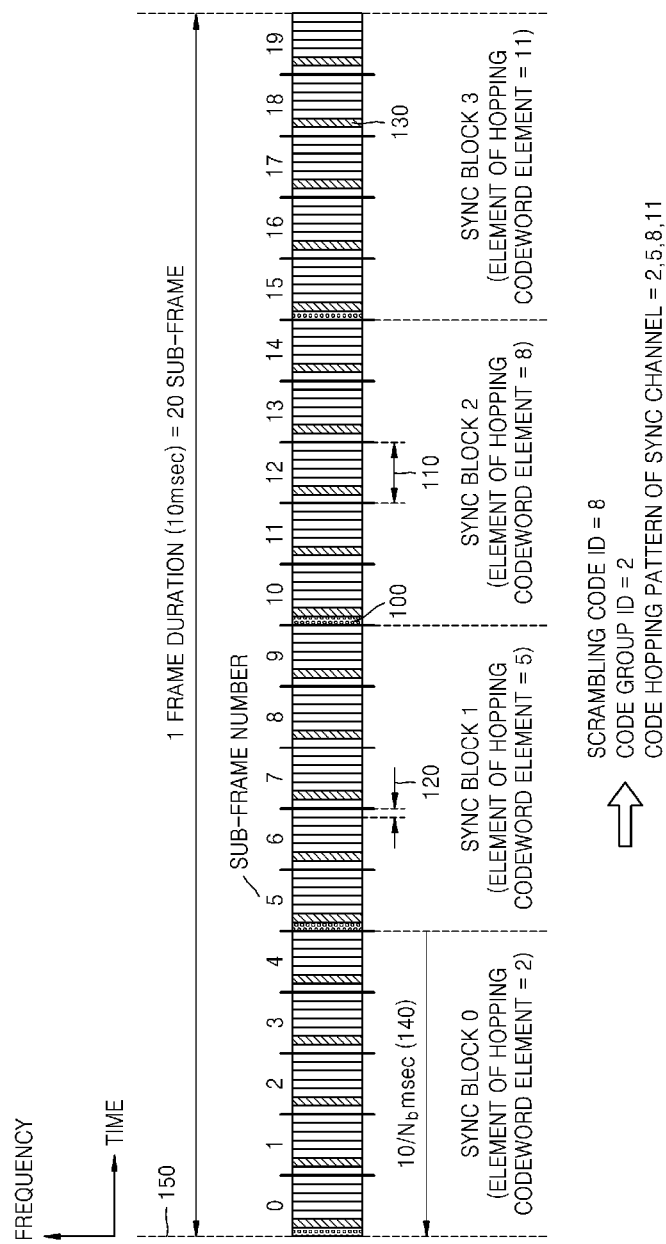
FIG. 1 illustrates a structure of a forward link frame according to an embodiment of the present invention.

The present invention will now be described more fully with reference to the accompanying drawings, in which exemplary embodiments of the invention are shown.

In general, each base station of an Orthogonal Frequency Division Multiplexing (OFDM) cellular system scrambles OFDM symbols using a long PN scrambling code. However, since the base station can use another scrambling code instead of the long PN scrambling code, any code used to scramble OFDM symbols is hereinafter called a scrambling code for convenience of description.

Although each base station according to an embodiment of the present invention can achieve transmission diversity using a method of including a plurality of transmission antennas, a delay diversity method, or other similar methods, it is assumed in the present specification for convenience of description that each of the base stations includes 2 transmission antennas.

Though a mobile station according to an embodiment of the present invention can achieve reception diversity using a method of including a plurality of reception antennas or other similar methods, it is assumed in the present specification for convenience of description that the mobile station includes 2 reception antennas. This mobile station must combine data of data paths according to the reception diversity. Though a simple summing method is used in the present specification as a data combining method, it will be understood by those of ordinary skill in the art that the data combining method is not limited to the simple summing method.

The present invention relates to a method of performing a cell search including sync acquisition, frame boundary detection, and scrambling code detection.

The term 'sync acquisition' will be used in the present specification as a comprehensive term for sync channel symbol timing detection, sync block timing detection, and sync block boundary detection. That is, since a position of a sync channel symbol can be obtained by detecting sync block timing, sync channel symbol timing is equivalent to the sync block timing. The term 'sync information' will be used in the present specification as a comprehensive term for information on sync channel symbol timing, information on sync block timing, and information on a sync block boundary. The term 'frame boundary detection' will be used in the present specification as a comprehensive term for frame boundary timing detection. The term 'frame boundary information' will be used in the present specification as a comprehensive term for information on frame boundary timing.

The term 'code group detection' will be used in the present specification as a comprehensive term for code group identifier detection and code group detection, and the term 'code group information' will be used in the present specification as a comprehensive term for a code group identifier and a code group. The term 'scrambling code detection' will be used in the present specification as a comprehensive term for scrambling code identifier detection and scrambling code detection, and the term 'scrambling code information' will be used in the present specification as a comprehensive term for a scrambling code identifier and a scrambling code.

A sync channel sequence is a sequence mapped to subcarriers occupied by sync channel in a frequency domain of a sync channel symbol, each element of the sync channel sequence being used as a Fourier coefficient in an occupied subcarrier frequency. In the present invention, a sequence indicates the sync channel sequence, and the number of sync channel sequences used in a system is the same as a code alphabet size of a hopping code used in the system.

A sync channel symbol signal (time domain signal) transmitted from every sync channel symbol position is generated by an inverse Fourier transform of the sync channel sequence, a different sync channel sequence can be used at every sync channel position, and a sequence index of a sync channel sequence used at every sync channel symbol position is an element of a hopping codeword assigned to a relevant base station.

A set of hopping codewords used in the system is defined as a hopping code.

The term 'Fourier transform' will be used for convenience of description in the present specification as a comprehensive term for discrete Fourier transform and fast Fourier transform.

FIG. 1 illustrates a structure of a forward link frame according to an embodiment of the present invention.

Referring to FIG. 1, the forward link frame has a 10-msec duration and includes 20 sub-frames 110. In FIG. 1, the horizontal axis represents time, and the vertical axis represents frequency (OFDM subcarrier). Each of the 20 sub-frames 110 has a 0.5-msec length and includes 7 or 6 OFDM symbols 120 including at least one common pilot symbol 130. In addition, each of the 20 sub-frames 110 includes a single or no sync channel symbol 100. In the current embodiment, a single sync channel symbol duration exists at every 5 sub-frames 110, and thus a total of 4 sync channel symbol durations exist in the forward link frame. In this case, a sync channel symbol repetition period 140 is the same as a length obtained by summing lengths of 5 sub-frames 110, and thus a repetition period of the total sync channel symbols in the forward link frame is 4. For convenience of description, the sync channel symbol repetition period 140 is called a sync block. That is, FIG. 1 shows that the number $N_b$ of sync blocks in a single frame (10 msec) is 4.

The OFDM symbols 120 that remain due to the exclusion of the sync channel symbols 100 are multiplied by a cell-specific scrambling code in a frequency domain in order to identify the cell. In the forward link frame illustrated in FIG. 1, a scrambling code having a scrambling code identifier (ID) of 8 and belonging to a code group having a code group ID of 0 is used. The scrambling code will be described later in detail.

The forward link frame according to an embodiment of the present invention has a structure whereby sync channel sequences, which are indicated by respective elements of a hopping codeword assigned to a base station, are assigned to respective sync channel symbols. In the present specification, a method of transmitting a sync channel sequence indicated by each element of a hopping codeword at every sync block is defined as sequence hopping of sync channel, wherein each hopping pattern, i.e., each hopping codeword, respectively corresponds to each scrambling code group. In FIG. 1, the used hopping codeword is (2, 5, 8, 11).

When a mobile station is initially turned on, the mobile station must first detect a 10-msec frame boundary 150 of a current cell to which the mobile station belongs and detect a scrambling code used by the current cell. The scrambling code detection is performed in order to detect the scrambling code ID 8 contained in the forward link frame illustrated in FIG. 1, which is a scrambling code ID of the current cell. This is called a mobile station's cell search process.

According to an OFDM cellular system according to an embodiment of the present invention, cell-specific scrambling codes are grouped into a plurality of code groups, each code group containing at least one scrambling code. Thereafter, information on a code group to which a scrambling code of a current cell belongs and information on a frame boundary are inserted into a hopping codeword assigned to sync channel symbols. That is, each hopping codeword specifies a code group and a frame boundary of each cell.

A mobile station can perform the cell search process using a forward link frame containing sync channel symbols, which are generated by performing the above-described process, and common pilot channel symbols. Since a mobile station can simultaneously detect a frame boundary and a code group using a sync channel having a single code structure, the mobile station can efficiently perform the cell search process. In addition, since the mobile station detects only a scrambling code belonging to the detected code group, complexity in a code detection process can be reduced. Pilot correlation is used in a code detection method, which will be described later in detail.

Figure 2:
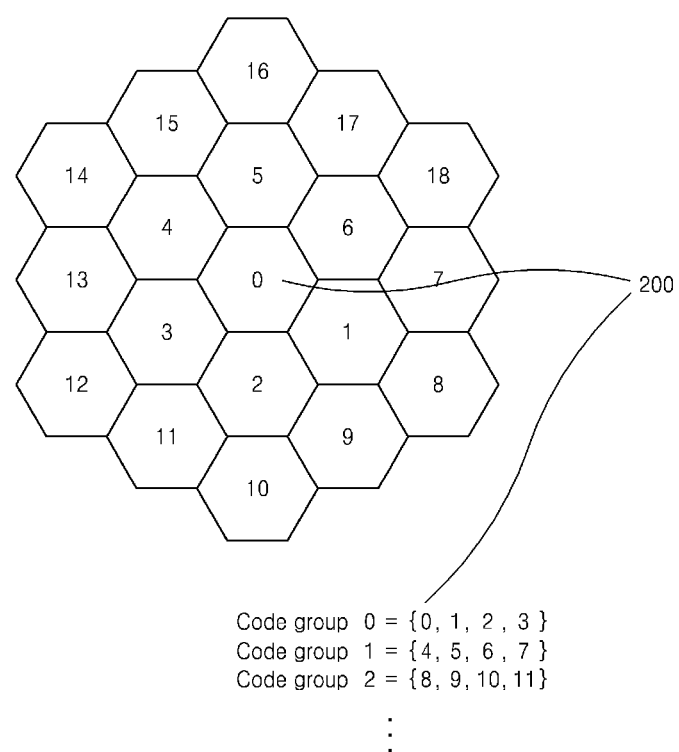
FIG. 2 is a conceptual diagram for explaining how to group scrambling codes according to an embodiment of the present invention.

FIG. 2 is a conceptual diagram for explaining how to group scrambling codes according to an embodiment of the present invention.

A scrambling code or scrambling code ID 200 used to scramble common pilot symbols or data symbols is assigned to each base station belonging to an OFDM cellular system. In particular, the OFDM cellular system according to an embodiment of the present invention groups the scrambling codes into code groups. That is, at least one scrambling code ID exists in each code group. Referring to FIG. 2, the number of scrambling codes used in the OFDM cellular system is at least 18, and the number of code groups is at least 4. Thus, each of the 4 code groups contains 8 scrambling code IDs 200 or scrambling codes. In particular, if each code group contains only one scrambling code, code groups respectively correspond to scrambling codes, and thus a hopping codeword can specify not only a code group but also a scrambling code.

Figure 3:
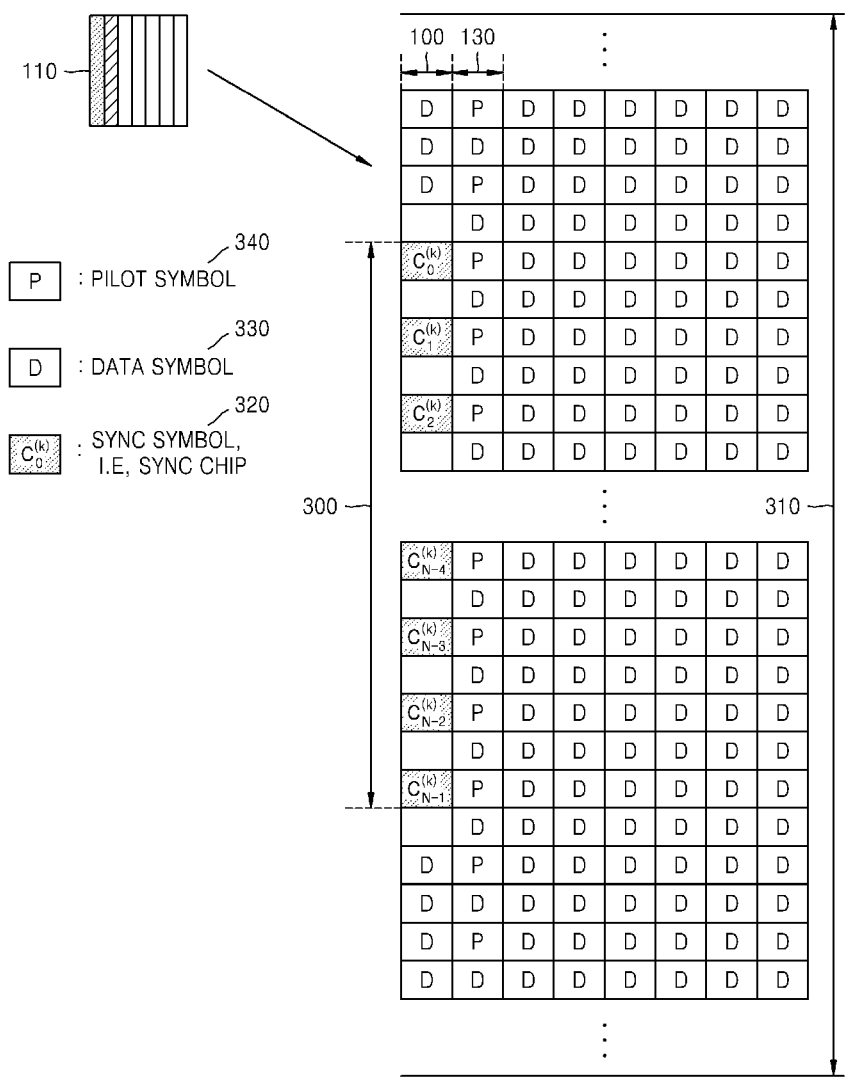
FIG. 3 illustrates a sub-frame containing a sync channel symbol according to an embodiment of the present invention.

FIG. 3 illustrates a sub-frame containing a sync channel symbol according to an embodiment of the present invention, e.g., a first sub-block 110 of a first sync block as illustrated in FIG. 1.

According to the sub-frame illustrated in FIG. 3, a first OFDM symbol 100 includes data symbol 330 and sync symbol 320 which is an element of a sync channel sequence assigned to the sync channel symbol, and a second OFDM symbol 130 includes pilot symbol 340 and the data symbol 330. As described above, the first OFDM symbol 100 is a sync channel symbol, and the second OFDM symbol 130 is a common pilot channel symbol. The sub-frame illustrated in FIG. 3 is just an illustration, and the sync channel symbol can be placed at another OFDM symbol in the sub-frame. The important feature is that a sync channel symbol position in every sync block is the same. That is, each interval between adjacent sync channels is the same. However, when symbols per one sub-frame are 6 and 7, the lengths of a cyclic prefix (CP) are different. Accordingly, when the numbers of the OFDM symbols in the sub-frames are 6 and 7, the sync channel symbol may be placed at the end of the sub-frames.

A sync channel sequence which is each element of a hopping codeword is assigned to each sync channel symbol, and each element of the assigned sync channel sequence is carried on each subcarrier belonging to a sync channel occupied bandwidth. As a method of assigning the sync channel occupied bandwidth, a sync channel can occupy a band, which remains, by excluding a guard band or by occupying a portion of the remaining band. An example of a system to which the latter method can be applied is a system which must support a scalable bandwidth, such as a $3^{rd}$ Generation Long Term Evolution (3G-LTE) system. That is, a mobile station using only 1.25 MHz, a mobile station using only 2.5 MHz, and all mobile stations using 5 MHz, 10 MHz, 15 MHz, and 20 MHz can acquire sync with a base station system when sync channel occupies only a portion of a total system bandwidth 310 as illustrated in FIG. 3. For example, when the system bandwidth 310 is 10 MHz, only 1.25 MHz in the center, which remains due to the exclusion of a DC subcarrier, is used. The 3G LTE system supports the bandwidth having a minimum standard of 10 MHz, and so when the system bandwidth is 20 MHz, the system bandwidth may have 1.25 MHz sync channel bands at each side of the 10 MHz bands in order for the mobile station to easily search adjacent cells during communication.

A cell search unit of a mobile station, which will be described later, can increase cell search performance by performing filtering so as to pass only a sync channel occupied band 300 illustrated in FIG. 3.

Referring to FIG. 3, a sync channel using one of 7 OFDM symbol durations in a sub-frame occupies a partial band 300 out of the entire band 310 as described above. The sync channel can use all subcarriers in the sync channel occupied band 300 or only one of 2 adjacent subcarriers as illustrated in FIG. 3. A predetermined value, e.g. 0, is assigned to the unused subcarrier in the latter method. In particular, if the latter method is used, a time domain signal of a sync channel symbol excluding a cyclic prefix has a pattern repeated in a time domain, which will be described later with reference to FIG. 4.

In FIG. 3, $C^{(k)}=[c_0^{(k)}, c_1^{(k)}, c_2^{(k)}, \ldots, c_{N-1}^{(k)}]$ indicates a sync channel sequence in which a hopping codeword element corresponding to a relevant sync channel symbol is k. Each element of the sync channel sequence, i.e., $c_0^{(k)}$, $c_1^{(k)}$, $c_2^{(k)}, \ldots, c_{N-1}^{(k)}$, has a value of a complex number, and is transmitted by being assigned to a subcarrier 320 belonging to the sync channel occupied band 300 illustrated in FIG. 3. An arbitrary sequence can be used as the sync channel sequence. For example, a Generalized Chirp Like (GCL) sequence defined using Equation 1 can be used as the sync channel sequence.

$$c_n^{(k)} = \exp\left\{-j2\pi k \frac{n(n+1)}{2N}\right\}, \quad (1)$$
$$n = 0, 1, \ldots, N-1,$$
$$k = 1, 2, \ldots, N-1$$

In Equation 1, k is defined as an index of an arbitrary element of a hopping codeword and denotes a sync channel sequence number, $C_n^{(k)}$ denotes an $n^{th}$ element of a $k^{th}$ sync channel sequence, N denotes the length of the GCL sequence. In particular, in the GCL sequence, each code length N is a prime number, and a total of N−1 sequences exist. That is, if the GCL sequence is used, a GCL sequence set used in a system consists of N−1 GCL sequences. The number of GCL sequences is the same as a code alphabet size of a hopping code.

A hopping codeword assigned to each base station is transmitted to a mobile station in the form of sync channel sequence hopping of a forward link frame. That is, in an embodiment of the present invention, the base station maps hopping codeword elements of which is a GCL sequence index to respective sync channel symbols, and transmits the sync channel symbols to a mobile station, which allows the mobile station to detect a hopping codeword included in the sync channel symbols transmitted from a target base station. Here, an example of the target base station can be a base station for which the mobile station initially searches or an adjacent base station to be searched so as to allow handover to occur.

The common pilot channel symbol 130 uses one or two of 7 or 6 OFDM symbol durations in the sub-frame illustrated in FIG. 3, and in the common pilot channel symbol duration, the pilot symbol 340 and the data symbol 330 can be multiplexed by using a Frequency Division Multiplexing (FDM) method. The common pilot channel is used to estimate a channel for coherent decoding of a data channel of a forward link and detect a scrambling code or a scrambling code ID in a third step of the cell search process according to an embodiment of the present invention, which will be described later in detail.

Table 1 is a table illustrating a set of sync channel hopping patterns of code groups, i.e., a set of hopping codewords, in a case where the number of code groups is 3 and the number of sync channel symbols in a forward link frame is 4 as illustrated in FIG. 2. That is, the 3 hopping patterns can be represented using hopping codewords, each having a length of 4, and the length of each hopping codeword is the same as the number of sync channel symbols per 10-msec frame. An entire set of hopping codewords is defined as a hopping code. Each base station uses the same sync channel hopping pattern (hopping codeword) for every frame, and base stations having different group numbers use different hopping codewords. Referring to Table 1, each hopping codeword consists of 4 hopping codeword elements and each hopping codeword respectively corresponds to a code group ID.

TABLE 1

| Hopping Codeword | Code Group ID |
|---|---|
| 3, 6, 9, 12 | 0 |
| 1, 4, 7, 10 | 1 |
| 2, 5, 8, 11 | 2 |

In Table 1, an alphabet size of a hopping code sequence is 40. That is, a hopping codeword element k transmitted through each sync block is one of numbers 1 to 40. For example, if a long PN scrambling code ID of a current base station is 8, the current base station belongs to a code group No. 2 (referring to FIG. 2), and a hopping codeword assigned to the code group No. 2 is {2, 5, 8, 11} (referring to Table 1). Thus, 4 sync channel symbols transmitted through each frame by the current base station respectively have hopping codeword elements of 2, 5, 8, and 11, and values defined by Equation 1 according to the hopping codeword element k are assigned to a subcarrier used by each of the 4 sync channel symbols. In particular, FIG. 1 shows an illustration of a case where a code group ID of the current base station is 2.

Specifically in Table 1, the number of scrambling codes is 12, which is equal to the number of code groups multiplied by the number of sync channel symbols in the frames. This is a condition ensuring the hopping patterns are orthogonal to all the cyclic shifts. Such a condition allows the mobile station to acknowledge a code group ID and a frame boundary to which the scrambling code belongs, and the scrambling code used by the current base station, when the mobile station demodulates only one sync channel symbol.

Meanwhile, a method of dividing one code sequence having a very long sequence length as much as the number of the sync channel symbol and allotting each divided code sequence to the sync channel symbol is also a kind of sequence hop, and one of ordinary skill in the art can easily understand that the method is in the range of the present invention using hopping codewords having orthogonality. An example of applying the GCL sequence, defined by Equation 1, as the code sequence of the above method is as follows. In this case, the number of sync channel symbols in one frame is 4 as shown in FIG. 1, and the number of sequence elements in one the sync channel symbol is 40. Also, in this case, a cell belonging to a code group 1 uses a GCL sequence corresponding to N=161 and k=1 as the code sequence, and a cell belonging to a code group 2 uses a GCL sequence corresponding to N=161 and k=2 as the code sequence. That is, the cell belonging to the code group 1 divides the code sequence into 4 sync channel sequences, and sequence-hops each sync channel symbol using the sync channel sequences. Here, an example of dividing the code sequence includes using sequence elements corresponding to n=0, 1, through to 39 from among the sequence elements of the code sequence in a first sync channel symbol and using sequence elements corresponding to n=40, 41 through to 79 in a second sync channel symbol, but is not limited thereto.

Figure 4:
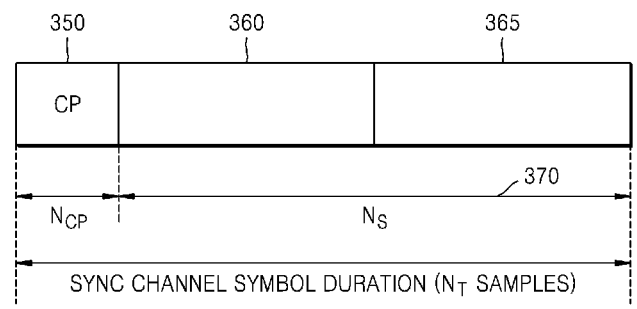
FIG. 4 illustrates a structure of a sync channel symbol in the time domain according to an embodiment of the present invention.

FIG. 4 illustrates a structure of a sync channel symbol in the time domain according to an embodiment of the present invention.

Referring to FIG. 4, $N_T$ denotes the number of samples of the entire sync channel OFDM symbol duration, $N_{CP}$ denotes the number of samples of a cyclic prefix (CP) duration 350, and $N_S$ denotes the number of samples of a symbol duration 370 excluding the CP duration 350. In particular, if the sync channel symbol uses only odd-th or even-th subcarriers in a sync channel occupied band for transmission of a relevant sync channel sequence and the sync channel symbol allocates a predetermined value (e.g., 0) to remaining subcarriers, a first duration 360 and a second duration 365 forming the duration denoted by reference numeral 370 have a specific pattern. If the sync channel symbol uses DC component subcarriers, the first duration 360 and the second duration 365 have the same waveform in a time domain signal of a transmitter end, and if the sync channel symbol does not use the DC component subcarriers, the second duration 365 has a waveform 180° phase reversed from a waveform of the first duration 360. By using this time domain repetition pattern of the sync channel symbol, sync can be acquired with a simple structure using a differential correlation operation, which will be described later in detail. The first duration 360 and the second duration 365 may also be symmetrical to each other. In this case, reverse differential correlation can be used. The differential correlation and the reverse differential correlation used in a sync acquisition process are within the spirit and scope of the present invention.

A base station according to an embodiment of the present invention transmits information contained in a hopping codeword assigned thereto to a mobile station in the base station's cell by carrying the information on a sync channel as illustrated in FIG. 1. That is, the code group information and 10-msec frame boundary information are contained in the hopping codeword and transmitted to the mobile station.

Thus, the sync channel allows the mobile station to achieve sync block timing in a first step of a cell search process and acquire a 10-msec frame timing and code group information in a second step of the cell search process. That is, according to an embodiment of the present invention, using only a single sync channel, the sync block timing is achieved_in the first step of the cell search process and the 10-msec frame timing and the code group information are acquired in the second step of the cell search process.

A primary sync channel is used in the first step of the cell search process and a secondary sync channel is used in the second step of the cell search process in a conventional WCDMA system, whereas the same single sync channel is used in the first and second steps of the cell search process according to an embodiment of the present invention. In addition, a sync channel used in the conventional WCDMA system is a signal spread in a time domain direct sequence spread spectrum, whereas a sync channel used in an embodiment of the present invention is a signal transmitted by being scrambled using a frequency domain code and OFDM modulation.

Figure 5:
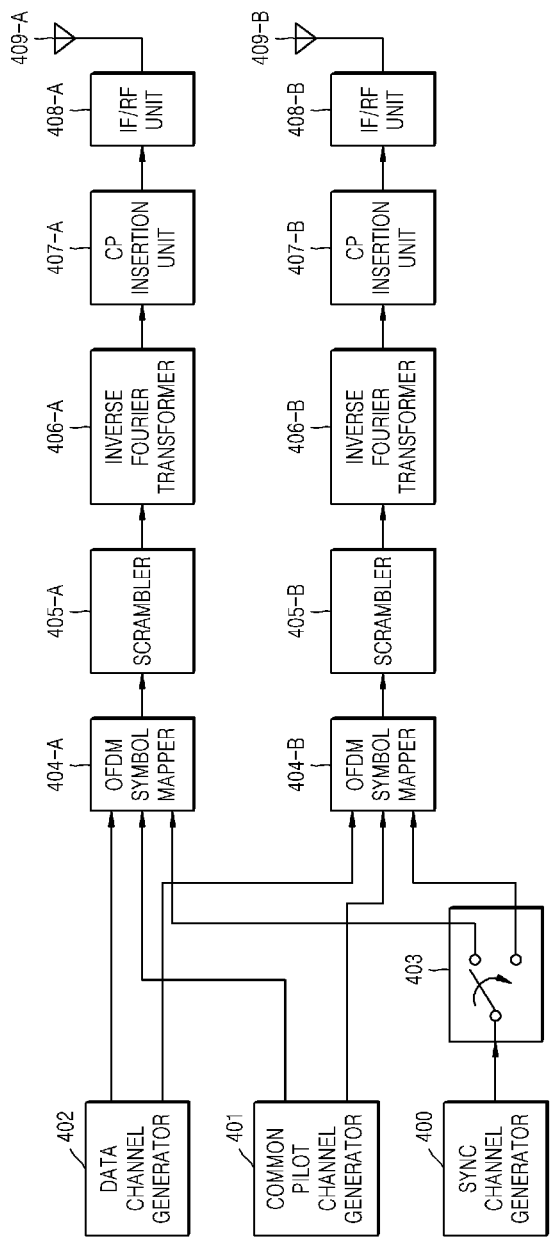
FIG. 5 is a block diagram of a base station according to an embodiment of the present invention.

FIG. 5 is a block diagram of a base station according to an embodiment of the present invention. Referring to FIG. 5, the base station includes a sync channel generator 400, a common pilot channel generator 401, a data channel generator 402, a diversity controller 403, OFDM symbol mappers 404-A and 404-B, scramblers 405-A and 405-B, inverse Fourier transformers 406-A and 406-B, CP insertion units 407-A and 407-B, intermediate frequency/radio frequency (IF/RF) units 408-A and 408-B, and transmission antennas 409-A and 409-B.

The data channel generator 402 generates data symbol that is to be transmitted such as reference numeral 330 of FIG. 3, and the common pilot channel generator 401 generates pilot symbol 340 illustrated in FIG. 3. The sync channel generator 400 generates a sync channel sequence, such as the sync channel sequence 320 illustrated in FIG. 3, corresponding to each element of a hopping codeword assigned to the base station. That is, if the hopping codeword assigned to the base station is {2, 5, 8, 11}, the sync channel generator 400 generates a sequence, i.e. N elements, obtained by substituting k=2 into Equation 1 for a first sync block. If the number of frequency domain subcarriers which a sync channel symbol can use for transmission of a relevent sync channel sequence is carried is less than N, e.g., if N=41 and the number of subcarriers occupied by the sync channel sequence is 38, the last 3 elements of the sync channel sequence defined using Equation 1 are not transmitted.

Each of the OFDM symbol mappers 404-A and 404-B maps data values of the data channel, the pilot channel, and the sync channel to positions in the frequency domain as illustrated in FIG. 3. Each of the scramblers 405-A and 405-B multiplies an output of each of the OFDM symbol mappers 404-A and 404-B, i.e., OFDM symbols excluding a sync channel symbol from the mapping result, by a base station's unique scrambling code in the frequency domain.

Each of the inverse Fourier transformers 406-A and 406-B generates a time domain signal by performing an inverse Fourier transform on the output of each of the scramblers 405-A and 405-B Each of the CP insertion units 407-A and 407-B inserts a CP for enabling demodulation of an OFDM signal, even with a channel multi-path delay, into the output of each of the inverse Fourier transformers 406-A and 406-B. Each of the IF/RF units 408-A and 408-B up-converts an output signal of each of the CP insertion units 407-A and 407-B, which is a baseband signal, to a band pass signal and amplifies the up-converted signal.

Each of the transmission antennas 409-A and 409-B transmits the amplified signal.

In FIG. 5, the number of transmission antennas 409-A and 409-B is 2. That is, if the base station according to an embodiment of the present invention has only one transmission antenna 409-A without the transmission antenna 409-B, the OFDM symbol mapper 404-B, the scrambler 405-B, the inverse Fourier transformer 406-B, the CP insertion unit 407-B, the IF/RF unit 408-B, and the diversity controller 403 can be omitted.

FIG. 5 illustrates a case where sync channel symbols are transmitted while achieving transmission diversity using 2 transmission antennas at a transmitter end of the base station. The transmission diversity using the diversity controller 403 illustrated in FIG. 5 will now be described. Sync channel symbols belonging to adjacent sync blocks are transmitted through different transmission antennas in order to achieve spatial diversity. For example, a sync channel symbol belonging to a first sync block is transmitted through the first transmission antenna 409-A, a sync channel symbol belonging to a second sync block is transmitted through the second transmission antenna 409-B, and a sync channel symbol belonging to a third sync block is transmitted through the first transmission antenna 409-A. This switching so as to achieve the spatial diversity is performed by the diversity controller 403. That is, using a method of applying Time Switching Transmit Diversity (TSTD) to the sync channel, the diversity controller 403 provides an output of the sync channel generator 400 to the OFDM symbol mapper 404-A or 404-B by switching the output of the sync channel generator 400.

Besides the spatial diversity or the TSTD diversity, delay diversity can be used as the transmission diversity.

Figure 6A:
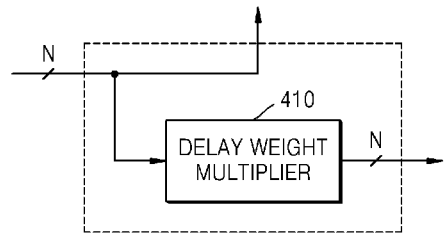
FIGS. 6A and 6B are a block diagram and a conceptual diagram, respectively, of a diversity controller in a case where delay diversity is applied to the base station illustrated in FIG. 5, according to an embodiment of the present invention.
Figure 6B:
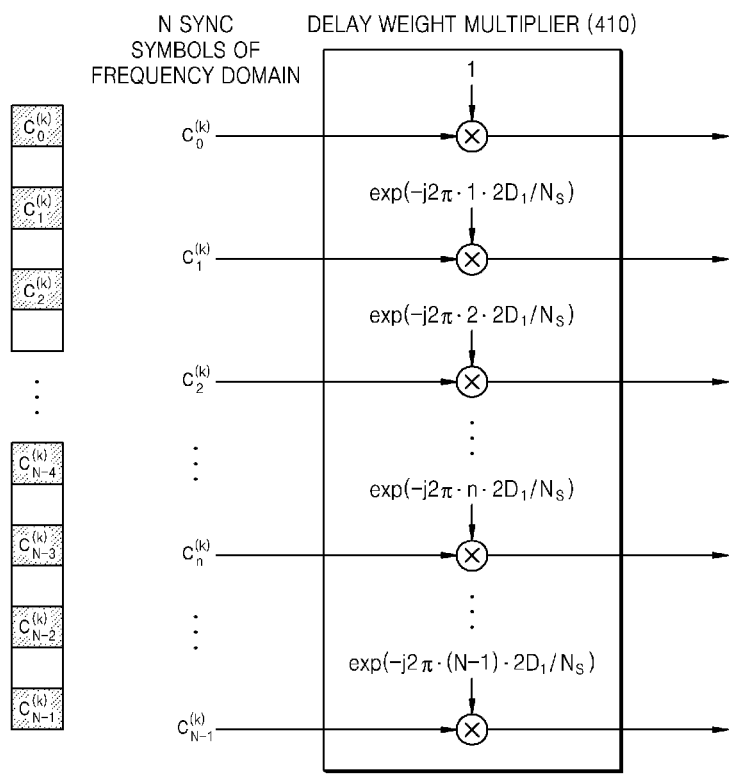

FIGS. 6A and 6B are a block diagram and a conceptual diagram, respectively, of the diversity controller 403 in a case where the delay diversity is applied to the base station illustrated in FIG. 5, according to an embodiment of the present invention.

Referring to FIG. 6A, the diversity controller 403 includes a delay weight multiplier 410. N sync symbols as illustrated in FIG. 3 are generated at every sync channel symbol by the sync channel generator 400 illustrated in FIG. 5. The generated sync symbols are separated into two data paths. According to the upper data path, the sync symbols are directly provided to the OFDM symbol mapper 404-A. According to the lower data path, the sync symbols are input to the delay weight multiplier 410, and the output of the delay weight multiplier 410 is input to the OFDM symbol mapper 404-B.

FIG. 6B is a conceptual diagram for explaining an operation of the delay weight multiplier 410.

Referring to FIG. 6B, the delay weight multiplier 410 delays the generated sync symbols and includes N multipliers.

Each of the N multipliers multiplies each sync symbol assigned to each subcarrier used by a sync channel symbol, i.e., each of the N pieces of generated sync symbol, by a weight. A weight w(n) multiplied by sync symbol assigned to an $n^{th}$ subcarrier used by the sync channel symbol is calculated using Equation 2.

$$w(n) = \exp(-j2\pi n \cdot 2D_m/N_s), n=0, 1, 2, \ldots, N-1 \quad (2)$$

In Equation 2, $D_m$ denotes a delay of an FFT sample unit in the time domain for an $m^{th}$ transmission antenna, and $N_s$ denotes the number of FFT samples. Since it is assumed, as illustrated in FIG. 3, that sync symbol is carried on every other subcarrier, $2D_m$ is used instead of $D_m$. If the number of transmission antennas 409-A and 409-B is 2 as illustrated in FIG. 5, a delay to the first transmission antenna 409-A is $D_0=0$, and a delay to the second transmission antenna 409-B is $D_1$.

The mobile station's cell search process according to an embodiment of the present invention is accomplished in 3 steps. The first step is a sync acquisition step, the second step is a step of detecting a code group and a frame boundary based on a sync block boundary acquired in the first step, and the third step is a step of detecting a scrambling code ID or a scrambling code of a current cell to which a mobile station belongs using the frame boundary and code group information acquired in the second step. In particular, in the second step of the cell search process, frequency offset estimation can be further included in order to increase a cell search's probability of success. In addition, after the third step of the cell search process, a fine timing/fine frequency detection step can be further performed.

Figure 7:
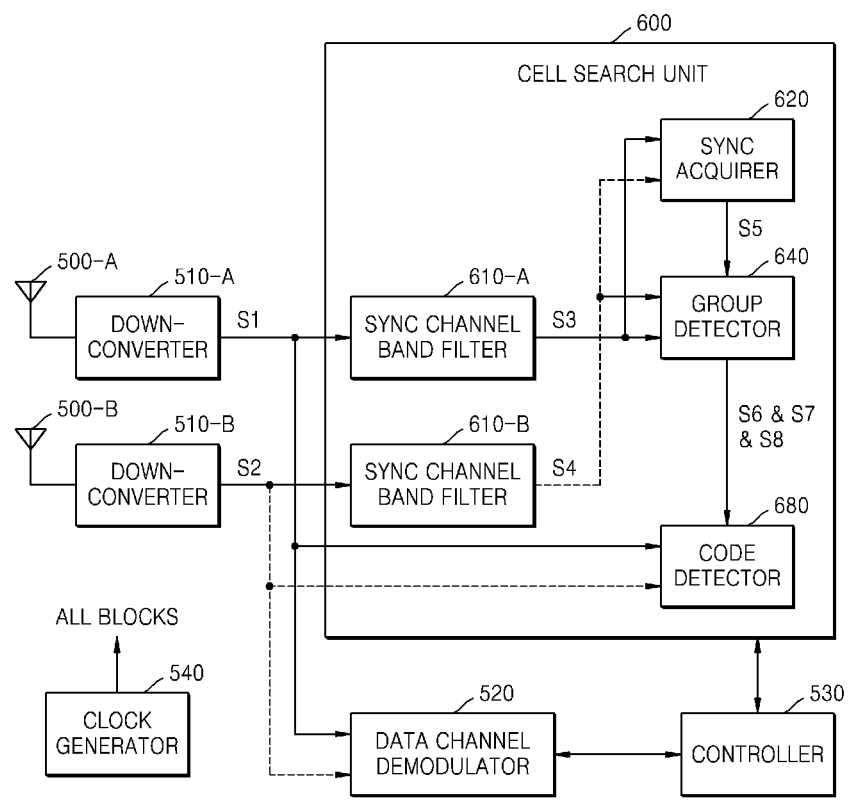
FIG. 7 is a block diagram of a receiver of a mobile station according to an embodiment of the present invention.

FIG. 7 is a block diagram of a receiver of a mobile station according to an embodiment of the present invention. The mobile station has at least one reception antenna, and FIG. 7 illustrates a case where the mobile station has 2 reception antennas.

Referring to FIG. 7, the receiver of the mobile station includes reception antennas 500-A and 500-B, down-converters 510-A and 510-B, a cell search unit 600, a data channel demodulator 520, a controller 530, and a clock generator 540.

RF signal type frames transmitted from base stations are received through the reception antennas 500-A and 500-B and converted to baseband signals S1 and S2 by the down-converters 510-A and 510-B.

The cell search unit 600 searches for a target cell using a sync channel symbol and a common pilot channel symbol included in the down-converted signals S1 and S2. As a result of the cell search, sync channel symbol timing, a frame boundary, and a long PN scrambling code of the target cell can be detected, and the target cell is, for example, searched for when the mobile station searches an initial cell at the first time or an adjacent cell, so as to allow handover to occur.

The controller 530 controls the cell search unit 600 and the data channel demodulator 520. That is, the controller 530 controls timing and descrambling of the data channel demodulator 520 based on a cell search result acquired by controlling the cell search unit 600. The data channel demodulator 520 demodulates data channel, such as data symbol 330 illustrated in FIG. 3, included in the down-converted signals S1 and S2 under control of the controller 530. All the hardware in the mobile station operates by being synchronized with a clock generated by the clock generator 540.

The cell search unit 600 includes sync channel band filters 610-A and 610-B, a sync acquirer 620, a group detector 640, and a code detector 680.

The sync channel band filters 610-A and 610-B perform band pass filtering in order to pass only the sync channel occupied band 300 from among the entire OFDM signal band 310 illustrated in FIG. 3, with respect to the down-converted signals S1 and S2.

The sync acquirer 620 acquires sync information S5 using a sync channel symbol included in the filtered signals S3 and S4.

The group detector 640 detects code group information S7 and 10-msec frame boundary information S6 using the acquired sync information S5 and the 3 codewords illustrated in Table 1 pre-stored in a memory (not shown) of the mobile station. The group detector 640 can increase detection performance by performing frequency offset estimation and compensation before detecting the code group information S7 and the 10-msec frame boundary information S6. In this case, an estimated frequency offset value can be provided to the code detector 680.

The code detector 680 detects a scrambling code by means of a pilot correlation of a common pilot channel symbol included in the down-converted signals S1 and S2 based on the detected code group information S7 and 10-msec frame boundary information S6. Although the common pilot channel symbol is extracted from the down-converted signals S1 and S2 as illustrated in FIG. 7, if the common pilot channel symbol is not influenced by the sync channel band filters 610-A and 610-B, the common pilot channel symbol can be extracted from the outputs S3 and S4 of the sync channel band filters 610-A and 610-B. In detail, the code detector 680 extracts the common pilot channel symbol by obtaining a position of the common pilot channel symbol based on the detected 10-msec frame boundary information S6, calculates correlation values between the extracted common pilot channel symbol and scrambling codes corresponding to scrambling code IDs belonging to the detected code group S7 selected from among pre-stored scrambling code IDs, and detects a scrambling code ID used by a current base station based on the correlation calculation result.

Figure 8:
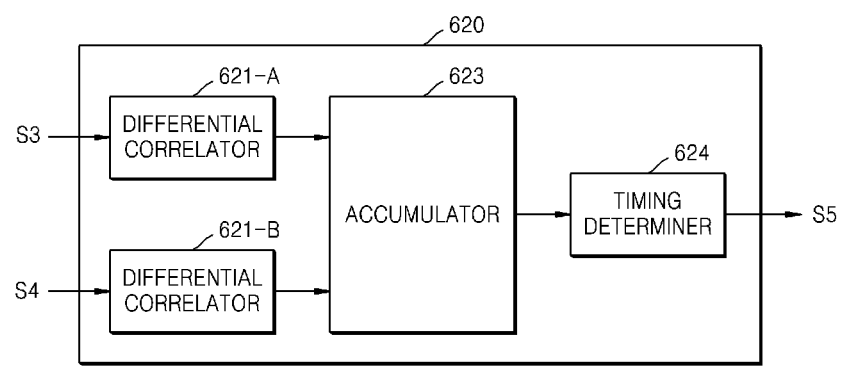
FIG. 8 is a block diagram of a sync acquirer of the receiver illustrated in FIG. 7, according to an embodiment of the present invention.

FIG. 8 is a block diagram of the sync acquirer 620 of the receiver illustrated in FIG. 7, according to an embodiment of the present invention. Referring to FIG. 8, the sync acquirer 620 includes differential correlators 621-A and 621-B, an accumulator 623, and a timing determiner 624. In FIG. 8, it is assumed that sync channel symbols use even-th or odd-th subcarriers from among subcarriers belonging to the sync channel occupied band 300 illustrated in FIG. 3.

Each of the differential correlators 621-A and 621-B multiplies a sample value of each of the output signals S3 and S4 of the sync channel band filters 610-A and 610-B by a sample value received previously to the current sample value by a time corresponding to an $N_S/2$ sample using the time domain signal repetition characteristic of sync channel OFDM symbols illustrated in FIG. 3 and accumulates the multiplication result. Here, $N_S/2$ denotes half of the OFDM symbol duration 370 excluding the CP duration 350 as illustrated in FIG. 3 and corresponds to the first duration 360 or the second duration 365.

Equations 3 and 4 represent outputs of the differential correlators 621-A and 621-B at an arbitrary sample point n according to an embodiment of the present invention.

$$z_a(n) = \left| \sum_{i=0}^{N_{CP}+\frac{N_s}{2}-1} r_a^*(n+i) r_a\left(n+i+\frac{N_s}{2}\right) \right|^2 \quad (3)$$

$$z_a(n) = \left| \sum_{i=0}^{N_{CP}+\frac{N_s}{2}-1} r_a^*(n+i) r_a\left(n+i+\frac{N_s}{2}\right) \right| \quad (4)$$

In Equations 3 and 4, $(\ )^*$ denotes a complex conjugate value, a denotes a reception antenna index having 0 or 1, and $r_a(n)$ denotes a sample value of a signal received at an $n^{th}$ sample point through an $a^{th}$ reception antenna.

A square of an absolute value and the absolute value are obtained in Equations 3 and 4 in order to maintain performance of the sync acquirer 620 regardless of an initial frequency offset. If the absolute value is not obtained in Equation 3 or 4, the performance of the sync acquirer 620 may be decreased in a state where the initial frequency offset is large.

The output of each of the differential correlators 621-A and 621-B, which is represented by Equation 3 or 4, is generated having a length of $5 \times 7 \times N_T$ per sync block with reference to FIG. 1, and the timing determiner 624 detects a position of a sample, which generates a peak value, among these differential correlation values and determines the detected sample position as sync channel symbol timing. However, the sync acquirer 620 according to an embodiment of the present invention may include the accumulator 623 in order to increase symbol sync detection performance.

The accumulator 623 combines the outputs of the differential correlators 621-A and 621-B, which are represented by Equation 3 or 4 with respect to two antennas, calculates antenna combining values at $5 \times 7 \times N_T$ sample positions, and accumulates each antenna combining value for samples separated by every sync block length from each sample position. That is, an output $\gamma(n)$ of the accumulator 623 can be represented by Equation 5.

$$\gamma(n) = \sum_{b=0}^{b-B-1} z(n + bL) \quad (5)$$

Here, z(n) denotes a sum of differential correlation values of the reception antennas represented by Equation 3 or 4, L denotes a sync block length, i.e. $5 \times 7 \times N_T$ with reference to FIG. 1, and B denotes the number of blocks having the length L, which are used for the differential correlation.

If the sync acquirer 620 includes the accumulator 623, the timing determiner 624 detects the maximum value from among $5 \times 7 \times N_T$ values represented by Equation 5, which are stored in the accumulator 623, and outputs a sample position of the detected maximum value as the detected timing information S5.

Figure 9:
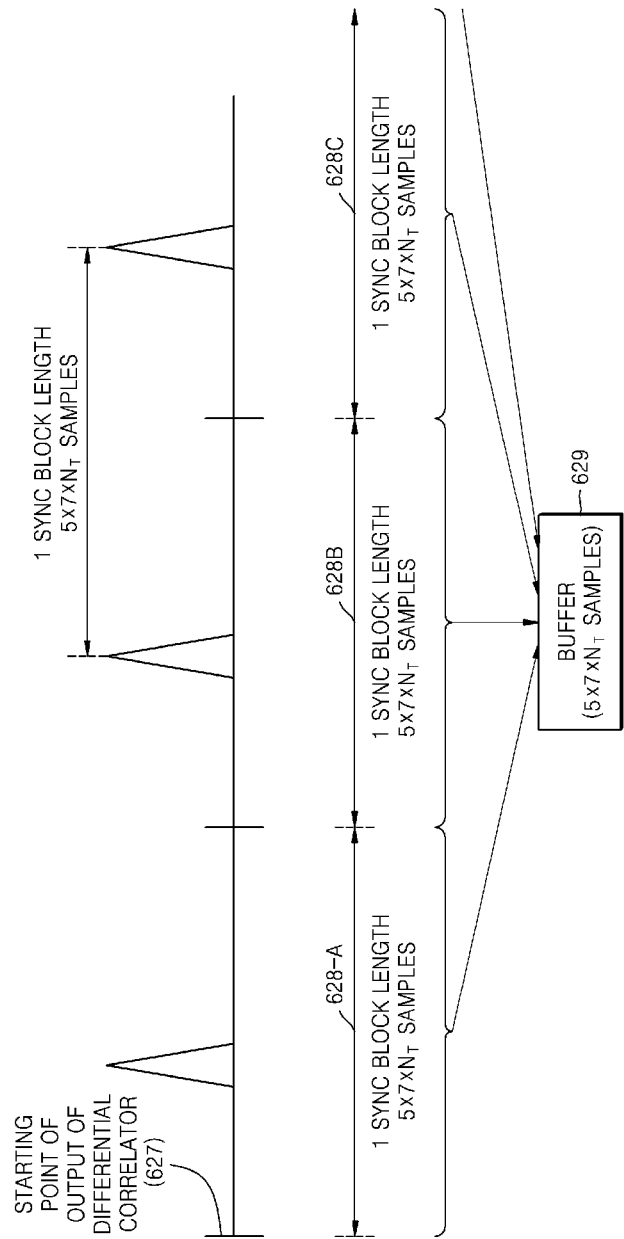
FIG. 9 is a graph illustrating differential correlation values calculated by a differential correlator illustrated in FIG. 8 based on sample positions according to an embodiment of the present invention.

FIG. 9 is a graph illustrating differential correlation values calculated by the differential correlator 621-A or 621-B illustrated in FIG. 8 based on sample positions according to an embodiment of the present invention. For convenience of description, it is assumed that the differential correlation values are obtained in an ideal channel environment in which fading or noise does not exist in a channel between a transmitter end of a base station and the receiver end of a mobile station.

In FIG. 9, the horizontal axis represents time or a sample index, and the vertical axis represents a differential correlation value at each position of the horizontal axis. Reference numeral 627 denotes a position of a first sample for which the differential correlator 621-A or 621-B performs the differential correlation. The differential correlator 621-A or 621-B calculates L differential correlation values by obtaining a differential correlation value from the first sample position and provides the calculated L differential correlation values to the accumulator 623. Thereafter, the differential correlator 621-A or 621-B calculates L differential correlation values from a position of a sample next to a sample for which the differential correlator 621-A or 621-B performed the last differential correlation and provides the calculated L differential correlation values to the accumulator 623. The differential correlator 621-A or 621-B repeats this process. Among all the L samples, a position at which a peak occurs exists as illustrated in FIG. 9 as a result of the repetition pattern of sync channel symbols. Here, L denotes a sync block length, i.e. $5 \times 7 \times N_T$ with reference to FIG. 1.

Figure 10:
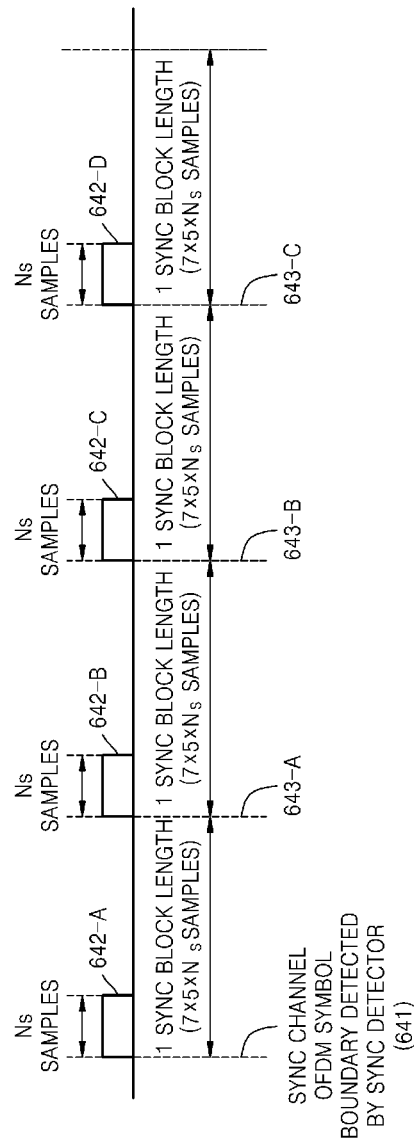
FIG. 10 illustrates a structure of an input signal provided to a group detector illustrated in FIG. 7 based on a sync channel Orthogonal Frequency-Division Multiplexing (OFDM) symbol timing acquired by the sync acquirer illustrated in FIG. 7, according to an embodiment of the present invention.

FIG. 10 illustrates a structure of an input signal provided to the group detector 640 illustrated in FIG. 7 based on sync channel symbol timing acquired by the sync acquirer 620 illustrated in FIG. 7, according to an embodiment of the present invention.

A CP of each OFDM symbol is removed based on sync channel symbol timing 641 acquired by the sync acquirer 620, and thereby, $N_S$ sample values are input to the group detector 640 in every sync block. Reference numerals 642-A, 642-B, 642-C, 642-D, and 642-E denote positions of sync channel symbols, which are obtained using the acquired sync channel symbol timing 641.

Figure 11:
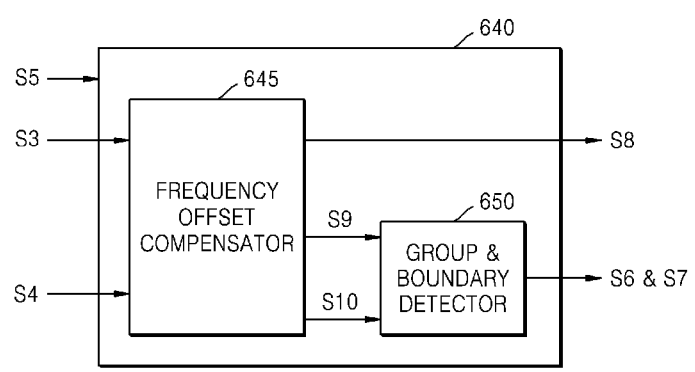
FIG. 11 is a block diagram of the group detector illustrated in FIG. 7, according to an embodiment of the present invention.

FIG. 11 is a block diagram of the group detector 640 illustrated in FIG. 7, according to an embodiment of the present invention. Referring to FIG. 11, the group detector 640 includes a frequency offset compensator 645 and a group & boundary detector 650.

The frequency offset compensator 645 sets the sync channel symbol timing 641 based on the output S5 of the sync acquirer 620, stores $P \times N_S$ received samples (642-A through 642-E) provided from each of the sync channel band filters 610-A and 610-B over several sync block durations based on the sync channel symbol timing 641, estimates a frequency offset S8 using the $P \times N_S$ received samples (642-A through 642-E), compensates for frequency offsets of the $P \times N_S$ received samples (642-A through 642-E) based on the estimated frequency offset S8, and provides the compensated $P \times N_S$ received signal samples S9 and S10 to the group & boundary detector 650. Here, P denotes the number of sync channel symbols used for the frequency offset compensation, the code group detection, and the frame boundary detection, e.g., the number of sync channel symbols included in a single frame, and in this case, P=5 with reference to FIGS. 1 and 10.

Equations 6 and 7 illustrate frequency offset compensation methods of the frequency offset compensator 645.

$$\Delta f = \frac{R_s}{\pi N_s} \tan^{-1}\left\{ \sum_{a=0}^{A} \sum_{p=0}^{P-1} \sum_{n=0}^{\frac{N_s}{2}} \left\{ r_{a,p}^*(n) r_{a,p}\left(n + \frac{N_s}{2}\right) \right\} \right\} \quad (6)$$

$$\Delta f = \frac{R_s}{\pi N_s} \tan^{-1}\left\{ -\sum_{a=0}^{A-1} \sum_{p=0}^{P-1} \sum_{n=0}^{\frac{N_s}{2}} \left\{ r_{a,p}^*(n) r_{a,p}\left(n + \frac{N_s}{2}\right) \right\} \right\} \quad (7)$$

Here, $R_S$ denotes an OFDM sampling frequency, A denotes the number of reception antennas, P denotes the number of sync channel symbols used for the frequency offset compensation, and $r_{a,p}(n)$ denotes an $n^{th}$ sample value among $N_S$ samples of a $p^{th}$ sync channel symbol from the initial reference timing 641 provided from the sync acquirer 620 with respect to an $a^{th}$ reception antenna.

Equations 6 and 7 use the repetition pattern of a time domain signal based on the structure of the sync channel symbol in the frequency domain illustrated in FIG. 3. In particular, Equation 6 indicates a frequency offset compensation method of a case where a transmitter end transmits a signal without carrying any data on DC subcarriers.

Equation 8 illustrates a frequency offset compensation method of the frequency offset compensator 645.

$$r'_{a,p}(n) = r_{a,p}(n) \times \exp\left\{-j2\pi \frac{\Delta f}{R_s} n\right\}, \quad (8)$$

$$n = 0, 1, 2, \ldots N_s - 1$$

That is, the frequency offset compensator 645 compensates for frequency offsets of P×$N_S$ received samples as illustrated in FIG. 10 based on a frequency offset estimated using the frequency offset compensation method illustrated in Equation 8. The frequency offset compensator 645 sequentially provides the frequency offset compensated P×$N_S$ samples S9 and S10 ($r'_{a,p}$) to the group & boundary detector 650 in $N_S$ units.

The group & boundary detector 650 detects a code group ID and a 10-msec frame timing using the frequency offset compensated samples S9 and S10 and the pre-stored hopping code illustrated in Table 1 and provides the detected code group information S7 and the frame timing information S6 to the code detector 680 illustrated in FIG. 7.

Figure 12:
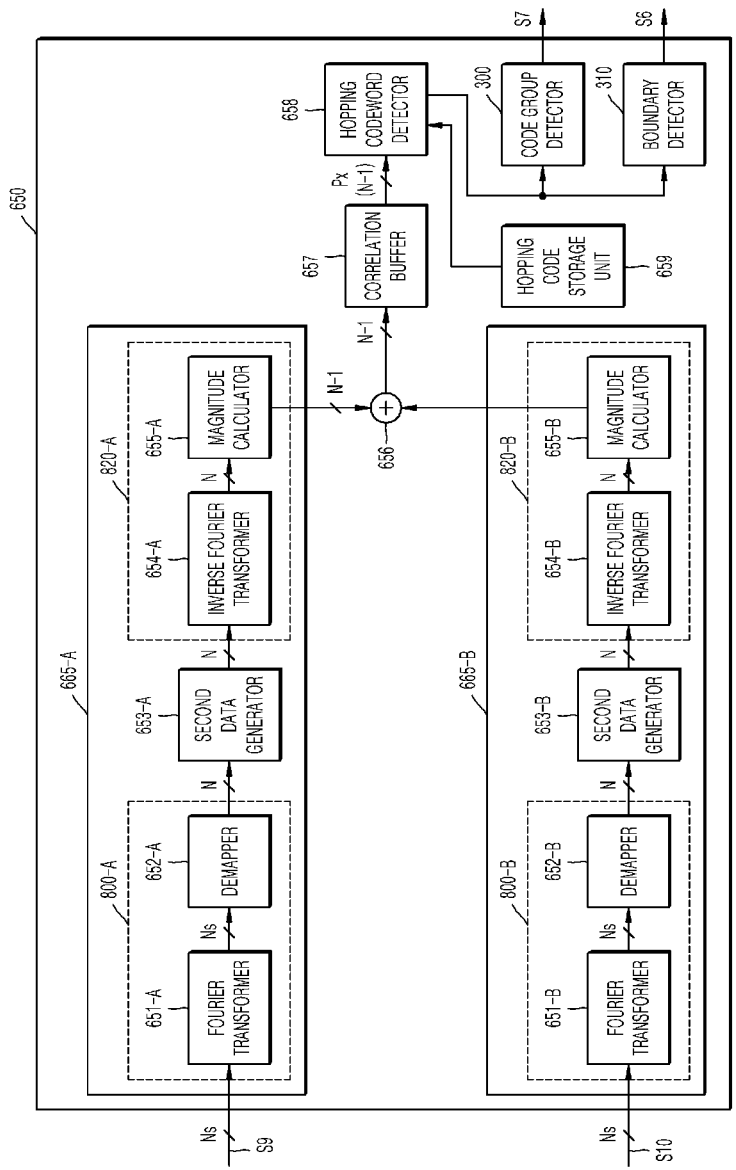
FIG. 12 is a block diagram of a group & boundary detector illustrated in FIG. 11, according to an embodiment of the present invention.

FIG. 12 is a block diagram of the group & boundary detector 650 illustrated in FIG. 11, according to an embodiment of the present invention. Referring to FIG. 12, the group & boundary detector 650 includes code correlation calculators 665-A and 665-B, a combiner 656, a correlation buffer 657, a hopping code storage unit 659, a hopping codeword detector 658, a boundary detector 310, and a code group detector 300.

Since the mobile station does not know what sync channel sequence index is included in each of the sync channel symbols (642-A through 642-E), the mobile station must calculate correlations of all possible sequences and $N_S$ samples of each of the sync channel symbols (642-A through 642-E).

The code correlation calculators 665-A and 665-B respectively calculate correlations of sync channel sequences and the sync channel symbols S9 and S10 frequency offset compensated by the frequency offset compensator 645.

The combiner 656 combines outputs of the code correlation calculators 665-A and 665-B and N−1 combined correlation values to the correlation buffer 657 for every sync channel symbol.

The correlation buffer 657 buffers N−1 combined correlation values of each P sync channel symbol. That is, P×(N−1) correlation values are stored in the correlation buffer 657. Here, the minimum value of P is 1. This is because when the hopping codes are orthogonal to the cyclic shifts, a hopping codeword can be detected even when one sync channel sequence is detected.

The hopping code storage unit 659 stores a plurality of hopping codewords as illustrated in Table 1.

The hopping codeword detector 658 calculates a correlation with each of the stored hopping codewords and all cyclic-shifted codeword of the stored hopping codeword by summing the calculated correlations of the corresponding sync channel sequence and detects a hopping codeword number included in the sync channel symbols, based on the result of the calculation.

The boundary detector 310 detects the frame boundary S6 based on a cyclic shift index of the detected hopping codeword. The boundary detector 310 also detects the code group S7 based on the detected hopping codeword. A detailed detection process will be described later.

In particular, if a sync channel sequence is based on a GCL sequence, the code correlation calculators 665-A and 665-B respectively include first data acquirers 800-A and 800-B, second data generators 653-A and 653-B, and correlation generators 820-A and 820-B.

The first data acquirers 800-A and 800-B respectively acquire data values of positions of subcarriers to which elements of the sync channel sequence are assigned from the frequency offset compensated sync channel symbols S9 and S10. The first data acquirers 800-A and 800-B respectively include Fourier transformers 651-A and 651-B and demappers 652-A and 652-B. The Fourier transformers 651-A and 651-B respectively acquire $N_S$ data values by Fourier transforming the sync channel symbols S9 and S10, and each of the demappers 652-A and 652-B acquires N data values of subcarriers to which the elements of the sync channel sequence are assigned from among the acquired $N_S$ data values.

The second data generators 653-A and 653-B respectively receive the outputs of the demappers 652-A and 652-B and perform differential encoding defined by Equation 9.

$$u(n) = y^*(n)y((n+1)_{\mod N}), n=0, 1, \ldots, N-1 \quad (9)$$

Here, y(n) denotes an output of each of the demappers 652-A and 652-B, and u(n) denotes an output of each of the second data generators 653-A and 653-B. The differential encoding is performed so as to obtain only a linear phase transition corresponding to a GCL sequence number k from N frequency domain signal components. That is, an environment in which channel distortion or noise does not exist is assumed, u(n) is represented by Equation 10.

$$u(n) = \exp\left\{-j2\pi \frac{n}{N} k\right\}, \quad (10)$$

$$n = 0, 1, \ldots, N-1$$

In Equation 10, k denotes a GCL sequence ID, which can have a value from 1 to N−1 as illustrated in Equation 1.

The correlation generators 820-A and 820-B respectively perform inverse Fourier transformation on N u(n) values of each sync channel symbol, i.e., outputs of the second data generators 653-A and 653-B, calculate a correlation of the sync channel symbol and each hopping code with absolute values of the inverse Fourier transformation result. The correlation generators 820-A and 820-B respectively include inverse Fourier transformers 654-A and 654-B and magnitude calculators 655-A and 655-B.

The inverse Fourier transformers 654-A and 654-B respectively generate N complex samples per sync channel symbol by performing inverse Fourier transformation on the outputs of the second data generators 653-A and 653-B. Each of the magnitude calculators 655-A and 655-B calculates magnitude of a complex sample by summing a square of a real number component and a square of an imaginary number component for each of the generated N complex samples. In particular, according to an embodiment of the present invention, a first value of the calculated N values is discarded, and only the remaining N−1 values are provided to the combiner 656.

Figure 13:
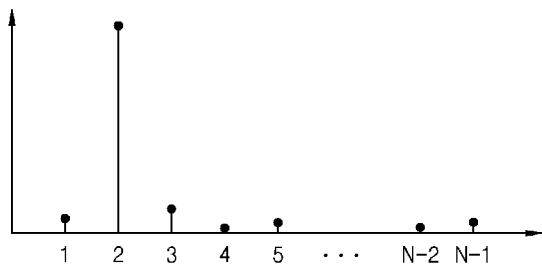
FIG. 13 is a graph illustrating outputs of a code correlation calculator illustrated in FIG. 12, according to an embodiment of the present invention.

FIG. 13 is a graph illustrating an output of the code correlation calculator 665-A or 665-B illustrated in FIG. 12, according to an embodiment of the present invention.

The horizontal axis represents sync channel sequence (GCL sequence) index, and the vertical axis represents correlation values of currently received sync channel symbols and each of N−1 sync channel sequences (GCL sequences). In particular, FIG. 13 illustrates an output of the code correlation calculator 665-A or 665-B when a hopping codeword element k contained in the currently received sync channel symbol is 2. Referring to FIG. 13, a correlation value is largest when k is 2. In particular, if channel distortion or noise does not exist, correlation values at sync channel sequence index positions excluding the sync channel sequence with index k=2 are 0 which is different from the illustration of FIG. 13.

FIG. 12 is based on the assumption that the mobile station employs reception diversity with two reception antennas, wherein the combiner 656 combines outputs of the code correlation calculators 665-A and 665-B, which are acquired according to the reception diversity. If the reception diversity is not used, the combiner 656 and the code correlation calculator 665-B placed in the lower part can be omitted.

The hopping codeword ID respectively corresponds to the code group ID of FIG. 2, and the cyclic shift index indicates how far the 10-msec frame boundary is from the first position 641 of the P sync channel symbol durations (642-A through 642-E) used by the group detector 640 in a unit of sync block length. That is, if the cyclic shift index is 0, the 10-msec frame boundary is the first sync channel symbol position 641 as illustrated in FIG. 10, and if the cyclic shift index is 1, the 10-msec frame boundary is a second position 643-A, and if the cyclic shift index is 2, or 3, the 10-msec frame boundary is a third position 643-B, or a fourth position 643-C.

Figure 14:
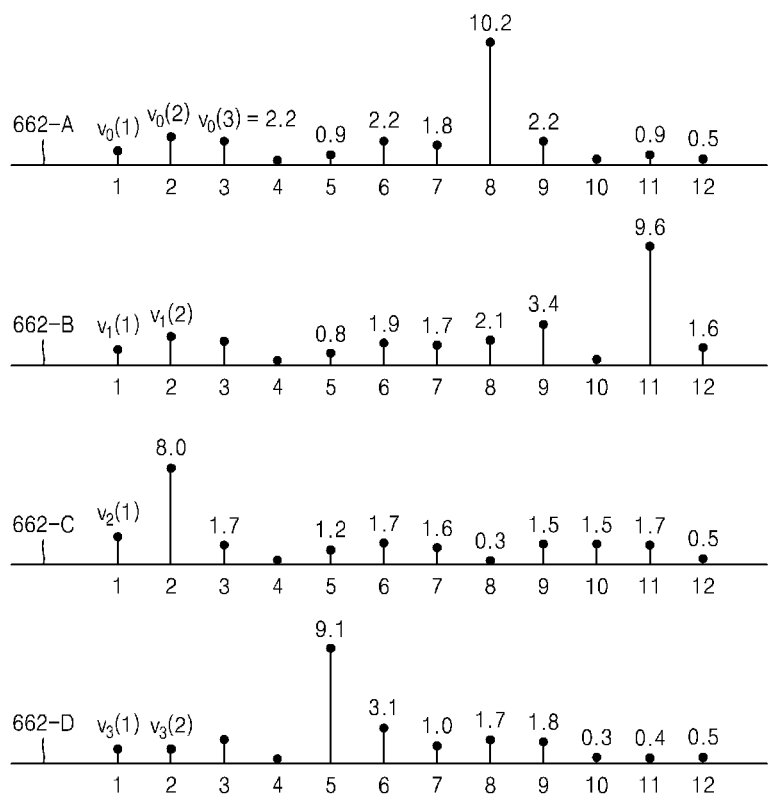
FIG. 14 illustrates correlation values stored in a correlation buffer illustrated in FIG. 12, according to an embodiment of the present invention.

FIG. 14 illustrates P×(N−1) correlation values stored in the correlation buffer 657 illustrated in FIG. 12, according to an embodiment of the present invention. In FIG. 14, it is assumed that P=2 and N=13. The horizontal axis represents sync channel sequence numbers, and the vertical axis represents correlation values of received sync channel symbols and each of N−1 sync channel sequences (GCL sequences).

Reference numeral 662-A indicates correlation values of a first sync channel symbol, i.e., a case of p=0, and 12 sync channel sequences, and each reference numeral 662-B, 662-C, or 662-D indicates correlation values of 12 sync channel sequences calculated for each of sync channel symbols corresponding to p=1, 2, and 3. That is, the uppermost 12 samples 662-A are an output of the combiner 656 with respect to the first OFDM symbol 642-A illustrated in FIG. 10, the second 12 samples 662-B are an output of the combiner 656 with respect to the second OFDM symbol 642-B illustrated in FIG. 10, and the third 12 samples 662-C are an output of the combiner 656 with respect to the third OFDM symbol 642-C ('642-A'를 '642-C'로 변경) illustrated in FIG. 10. The fourth 12 samples 662-D are also described in the same manner.

The hopping codeword detector 658 calculates $N_G \times P$ decision variables, selects a decision variable having the maximum value from among the $N_G \times P$ decision variables, and provides information on the selected decision variable to the boundary detector 310 and the code group detector 300.

The boundary detector 310 and the code group detector 300 respectively detect the frame boundary S6 and the code group S7 based on the provided information.

A decision variable w(i) according to an embodiment of the present invention is represented by Equation 11.

$$w(i) = \sum_{u=0}^{P-1} v_u(h_{\lfloor i/P \rfloor}((i_{mod P} + u)_{mod P})), \quad (11)$$

$$i = 0, 1, \ldots, P \times N_G - 1$$

Here, mod denotes a modular operator, $\lfloor x \rfloor$ denotes the maximum value out of integers equal to or less than x, $N_G$ denotes the number of code groups or hopping codewords used in a system, which is indicated to be 3 based on Table 1, P denotes a hopping codeword length or the number of sync channel symbols per 10-msec frame, which is indicated to be 4 based on FIG. 1 and Table 1, and $h_x(y)$ denotes an index value of a $y^{th}$ element of a hopping codeword whose index is x, e.g., when x=0 and y=2, $h_{0(2)}$ is 9 with reference to Table 1.

In Equation 11, $v_u(k)$ is a correlation value of a sync channel sequence whose index is k with respect to a $u^{th}$ OFDM symbol position and is stored in the correlation buffer 657. Equation 11 represents a decision variable of each of the hopping codewords of Table 1 and all cyclically shifted codewords of the hopping codewords. That is, a decision variable of a hopping codeword {3, 6, 9, 12} whose index is 0 is w(0), a decision variable of a hopping codeword {9, 5, 6, 7, 8}, which is "1" cyclically shifted from the hopping codeword {6, 9, 12, 3} whose index is 0, is w(1), and a decision variable of a hopping codeword, which is "u" cyclically shifted from a hopping codeword whose index is i, is w(i×P+u).

A process of calculating w(i) by referring to FIG. 14 and Table 1 will now be described in detail. w(0) is a decision variable of a hopping codeword {3, 6, 9, 12} whose ID is 0 and cyclic shift index is 0, i.e., w(0)=2.2+1.9+1.5+0.6=5.1. w(2) is a decision variable of a hopping codeword {9, 12, 3, 6} whose ID is 0 and cyclic shift index is 2, i.e., w(2)=2.2+1.6+1.7+30.1=8.6. Through this process, w(0), w(1), through to w(P×$N_G$−1) are calculated, and if w(10=2×4+2) has the maximum value with 10.2=9.6=8.0=9.1=36.9, the hopping codeword detector 658 finally determines that a hopping code index is 2 and a cyclic shift index is 2, and detects a frame boundary and a code group.

That is, if it is assumed that an index of a decision variable having the maximum value among P×$N_G$−1 decision variables, i.e., w(0), w(1), through to w(P×$N_G$−1), is $i_{max}$, i.e., $$i_{max} = \max_i w(i),$$

the hopping codeword detector 658 calculates a hopping code index and a cyclic shift index as $\lfloor i_{max} \div P \rfloor$ and $(i_{max})_{mod\ P}$, respectively. Since a hopping codeword respectively corresponds to a code group, a code group can be detected from an index of a hopping codeword, and a frame boundary can be detected from a cyclic shift index.

According to an embodiment of the present invention, decision variable information provided from the hopping codeword detector 658 to the boundary detector 310 and the code group detector 300 is $i_{max}$. The boundary detector 310 detects a cyclic shift index by performing a modular operation $(i_{max})_{mod\ P}$ using the received decision variable information $i_{max}$ and detects a frame boundary based on the detected cyclic shift index. The code group detector 300 detects an index of a hopping codeword by performing an operation $\lfloor i_{max} \div P \rfloor$ using the received decision variable information $i_{max}$ and detects a code group corresponding to the detected hopping code index.

Meanwhile, although in regard to the current embodiment a description is given of the processes of detecting the frame boundary and the code group based on when P=4, that is, based on the number of sync channel symbols in one frame, the same processes can be applied when P=1, using the orthogonality of the hopping codes and the cyclic shifts. A process of searching a cell using only the first sync channel symbol based on a sync channel symbol sync obtained in the first step of cell search process will now be described. First, an output of the combiner 656 is 12 correlation values of the first sync channel symbol, and when these correlation values correspond to each value of 662-A as shown in FIG. 14, the peak correlation value from among the 12 correlation values occurs on the position of the sync channel sequence index value 8. That is, a hopping codeword element 8 is detected, and it can be presumed that the hopping codeword element 8 belongs to hopping codeword 2 and that the cyclic shift index is 2, using Table 1.

As described above, if each code group contains only one scrambling code, a hopping codeword respectively corresponds to a scrambling code, and thus the hopping codeword detector 658 can detect a scrambling code from the detected code group. Thus, in this case, the third step of the cell search process can be omitted or used for verification of a scrambling code detected in the second step of the cell search process.

Figure 15:
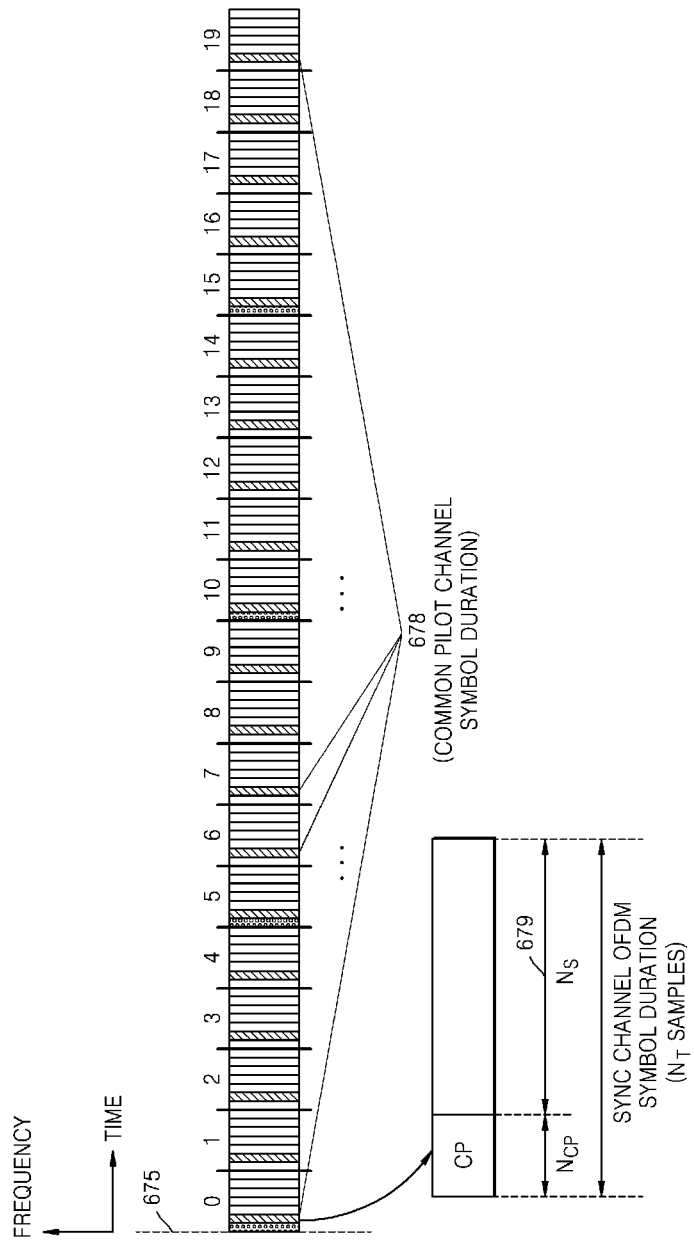
FIG. 15 illustrates a structure of frame information acquired in a second step of a cell search process according to an embodiment of the present invention.

FIG. 15 illustrates a structure of frame information acquired in the second step of the cell search process according to an embodiment of the present invention. The code detector 680 detects a scrambling code based on the frame information.

Referring to FIG. 15, reference numeral 675 denotes a frame boundary detected in the second step of the cell search process, i.e., by the group detector 640, and the code detector 680 can acquire positions of common pilot channel symbols, i.e., common pilot channel symbol durations 678, based on the detected frame boundary 675 and can finally detect a scrambling code of a target base station by performing pilot correlation between the common pilot channel symbol and scrambling codes belonging to a code group detected in the second step of the cell search process based on the acquired position. Each common pilot channel symbol includes $N_T$ samples as other OFDM samples, including a CP duration having $N_{CP}$ samples and a remainder duration 679 having $N_S$ samples.

In other words, the code detector 680 extracts a common pilot channel symbol contained in a received sub-frame based on the frame boundary information acquired in the second step of the cell search process, calculates correlation values of the extracted common pilot channel symbol and scrambling codes belonging to a code group detected in the second step of the cell search process, and determines a scrambling code of a current base station with a scrambling code corresponding to the maximum correlation value out of the calculated correlation values. That is, the common pilot channel symbol is used to estimate a channel for coherent demodulation of a data channel of a forward link and detect a scrambling code in the third step of the cell search process according to an embodiment of the present invention.

Complexity of the receiver can be reduced by the code detector 680 searching only scrambling codes belonging to a code group received from the group detector 640. That is, as illustrated in FIG. 2, at least 19 scrambling codes exist in the system, and the code detector 680 can search only $N_c$ scrambling codes belonging to a code group detected in the second step of the cell search process among the 512 scrambling codes. Here, $N_c$ denotes the number of scrambling codes per code group, $N_c=4$ according to FIG. 2.

Figure 16:
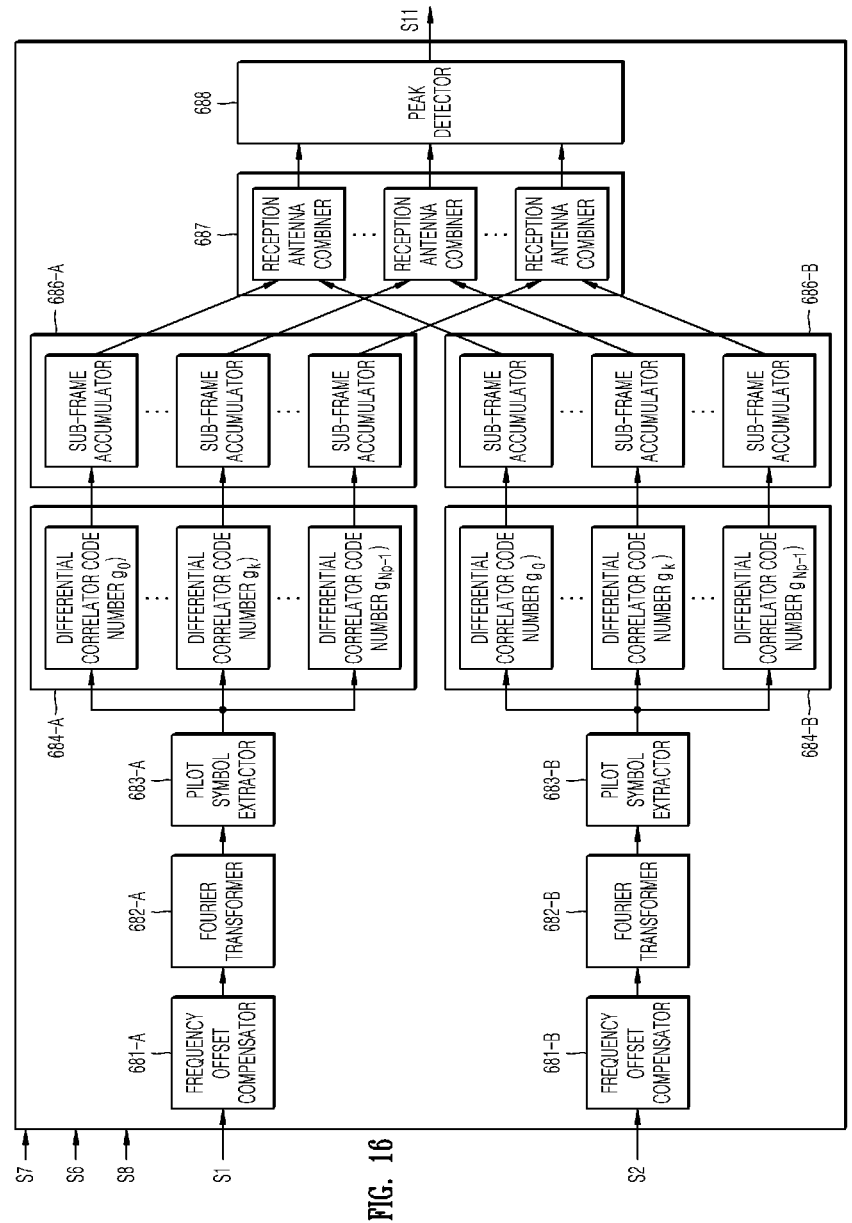
FIG. 16 is a block diagram of a code detector illustrated in FIG. 7, according to an embodiment of the present invention.

FIG. 16 is a block diagram of the code detector 680 illustrated in FIG. 7, according to an embodiment of the present invention. Referring to FIG. 16, the code detector 680 includes frequency offset compensators 681-A and 681-B, Fourier transformers 682-A and 682-B, pilot symbol extractors 683-A and 683-B, pilot correlators 684-A and 684-B, accumulators 686-A and 686-B, a combiner 687, and a peak detector 688.

Since each of the frequency offset compensators 681-A and 681-B can detect the common pilot channel symbol duration 678 of each sub-frame based on the 10-msec frame boundary information S6 675 received from the group detector 640, each of the frequency offset compensators 681-A and 681-B frequency offset compensates the $N_S$ samples 679 excluding the CP of the common pilot channel symbol contained in the down-converted OFDM symbols S1 or S2 using Equation 8. Here, the frequency offset estimation value S8 received from the group detector 640 can be used as a frequency offset estimation value used for the frequency offset compensation.

Each of the Fourier transformers 682-A and 682-B generates a frequency domain signal by performing Fourier transformation on the $N_S$ frequency offset compensated samples.

Each of the pilot symbol extractors 683-A and 683-B extracts only $N_p$ pieces of pilot symbol from the generated frequency domain signal.

Each of the pilot correlators 684-A and 684-B calculates correlation values of the extracted $N_P$ pieces of pilot symbol and the $N_c$ scrambling codes belonging to the code group received from the group detector 640. Here, Equations 12 through 15 can be used to calculate the correlation values. Each of the pilot correlators 684-A and 684-B includes $N_c$ differential correlators performing a differential correlation operation in a parallel method. That is, each of the $N_c$ differential correlators calculates a correlation value of each extracted pilot symbol and each scrambling code belonging to the code group. Each of the $N_c$ differential correlators operates in the common pilot channel symbol duration 678 of each sub-frame, and an output of each of the $N_c$ differential correlators is accumulated in each sub-frame accumulator included in the accumulators 686-A and 686-B based on the $N_c$ scrambling codes belonging to the detected code group. Equation 12 through 15 will be described later.

Each of the accumulators 686-A and 686-B accumulates $N_c$ correlation values calculated with respect to each common pilot channel symbol. Referring to FIG. 1, since one common pilot channel symbol per sub-frame exists, each of the accumulators 686-A and 686-B accumulates correlation values corresponding to a predetermined number of sub-frames. Each of the accumulators 686-A and 686-B includes $N_c$ sub-frame accumulators.

The combiner 687 generates $N_c$ decision variables by combining outputs of the accumulators 686-A and 686-B, which are calculated through a plurality of paths according to the reception diversity realized using a plurality of antennas. It will be understood by those of ordinary skill in the art that the combiner 687 and the blocks in the lower part can be omitted if reception diversity is not used.

The peak detector 688 finally detects a scrambling code S11 of a current base station by detecting a decision variable having the maximum value out of the $N_c$ decision variables provided by the combiner 687 and selecting a scrambling code corresponding to the detected decision variable. Through this process, the mobile station can detect a scrambling code of a base station having the shortest radio distance or a base station having the highest reception signal intensity. If the detected maximum value is greater than a predetermined threshold, it is considered that the cell search process has been completed, and if the detected maximum value is less than the predetermined threshold, the cell search unit 600 according to an embodiment of the present invention repeatedly performs the first, second, and third steps of the cell search process.

If each code group contains only one scrambling code, i.e., if $N_c=1$, a code group ID respectively corresponds to a scrambling code ID, and thus a frame boundary and a scrambling code ID, which are the purpose of the present invention, can be detected even when only the first and second steps of the cell search process are performed. Thus, in this case, the third step of the cell search process can be omitted or used for verification of a scrambling code ID detected in the second step of the cell search process.

An operation of the pilot correlator 684-A or 684-B will now be described in detail.

Figure 17:
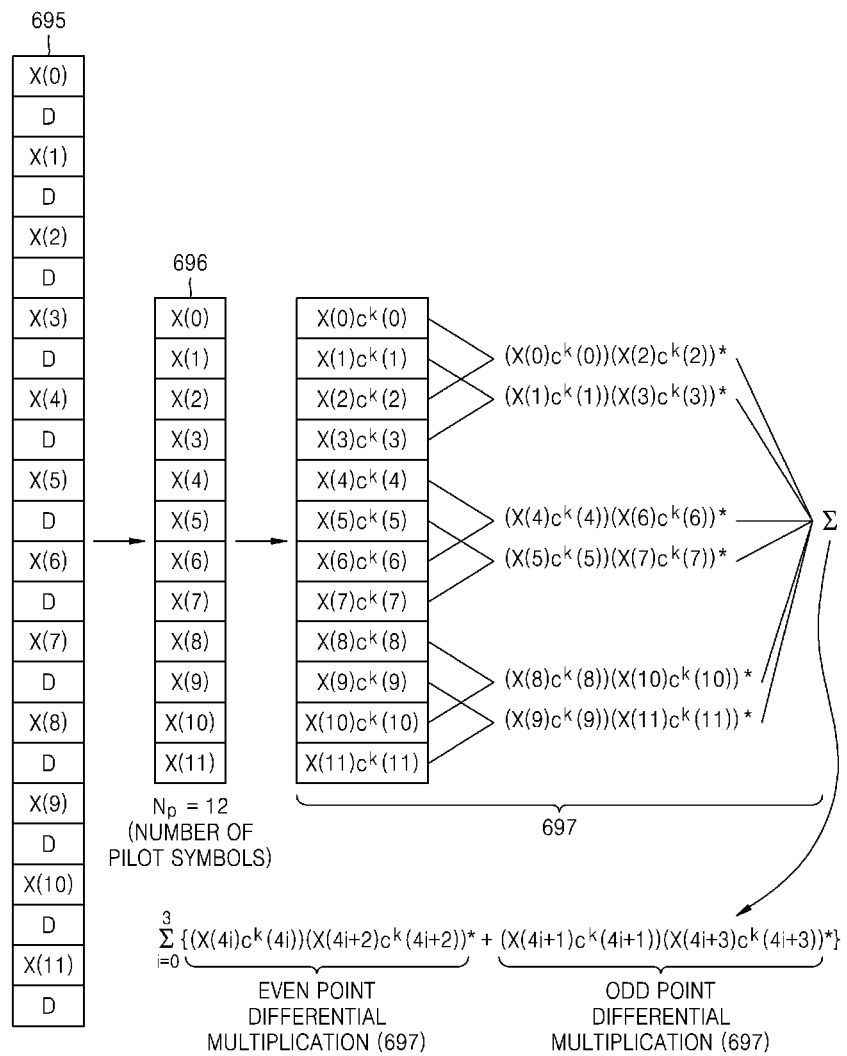
FIG. 17 is a conceptual diagram for explaining an operation of a pilot correlator according to an embodiment of the present invention.

FIG. 17 is a conceptual diagram for explaining an operation of the pilot correlator 684-A or 684-B according to an embodiment of the present invention.

Referring to FIG. 17, reference numerals 695 and 696 respectively denote an input and an output of the pilot symbol extractors 683-A or 683-B. That is, pilot symbol and data symbol may exist together in a frequency domain signal, and in this case, the pilot symbol extractor 683-A or 683-B extracts $N_P$ pieces of pilot symbol from the frequency domain signal 695. In FIG. 17, X(n) denotes $n^{th}$ pilot symbol from among frequency domain data of a common pilot channel symbol. In particular, in FIG. 17, the common pilot channel symbol contains $N_P$ pieces of pilot symbol.

Equations 12 through 15 represent a method of correlating the extracted pilot symbol and a scrambling code.

$$\sum_{i=0}^{\frac{N_P}{4}-1} \left\{ \begin{array}{l} (X(4i)(c_{g_k}(4i))^*)(X(4i+2)(c_{g_k}(4i+2))^*) + \\ (X(4i+1)(c_{g_k}(4i+1))^*)(X(4i+3)(c_{g_k}(4i+3))^*)^* \end{array} \right\} \quad (12)$$

Here, $N_P$ denotes the number of pieces of pilot symbol in the frequency domain, which are contained in a common pilot channel symbol, and $c_{g_k}(u)$ denotes a $u^{th}$ element of a $k^{th}$ scrambling code out of scrambling codes belonging to a detected code group.

The differential correlation represented by Equation 12 is used in the third step of the cell search process according to an embodiment of the present invention because of the following reason. In an OFDM signaling method, adjacent symbols in the frequency domain undergo almost the same wireless fading. That is, channel distortion over the adjacent symbols is almost the same. However, wireless fading between symbols far from each other is independent if a gap between the symbols in the frequency domain is large. In this case, the performance of a conventional frequency domain correlator defined by Equation 13 is significantly decreased if a correlation length N is large.

$$\sum_{i=0}^{N-1} \{(X(i)(c(i))^*)\} \quad (13)$$

That is, since $X(i)=a_i c(i)$ in Equation 13, Equation 13 becomes $$\sum_{i=0}^{N-1} a_i,$$

and thus, a wireless fading effect is coherently added for independent symbols X( ) far from each other, and the performance of the conventional frequency domain correlator is significantly decreased in a channel that undergoes fading.

Here, $a_i$ denotes a channel value of an $i^{th}$ subcarrier and has a characteristic in that channel values are almost the same for adjacent subcarriers in the fading channel but different from each other for subcarriers far from each other.

$$\sum_{i=0}^{\frac{N}{2}-1} \{(X(2i)(c(2i))^*)(X(2i+1)(c(2i+1))^*)^*\} \quad (14)$$

However, if a differential correlator defined by Equation 14 is used, a correlation value becomes $$\sum_{i=0}^{\frac{N}{2}-1} a_{2i} a_{2i+1}^* \approx \sum_{i=0}^{\frac{N}{2}-1} |a_{2i}|^2,$$

and thus a better performance can be achieved than the conventional frequency domain correlator.

In the third step of the cell search process according to an embodiment of the present invention, the reason differential multiplication is used between every other pilot symbol as in Equation 12 or reference numeral 697 as illustrated in FIG. 17 instead of using differential multiplication between adjacent symbols as in Equation 14 is due to the fact that the mobile station cannot detect information about a current base station to which the mobile station belongs in an initial sync acquisition mode. That is, the mobile station cannot detect whether the number of transmission antennas used in the current base station is 1 or 2.

If the number of transmission antennas is 1, all pilot symbols 696 illustrated in FIG. 17 are transmitted through the same transmission antenna. However, if the number of transmission antennas is 2, even-th pilot symbols (i.e., X(0), X(2), . . . ) are transmitted through a first transmission antenna, and odd-th pilot symbols are transmitted through a second transmission antenna. In this case, i.e., if the number of transmission antennas is 2, pilot symbols that are adjacent in the frequency domain undergo fully independent fading. In this case, if a receiver end performs differential multiplication between adjacent pilot symbols as in Equation 14, detection performance may be decreased. However, if the differential correlation according to an embodiment of the present invention is performed as illustrated by reference numeral 697 of FIG. 17, i.e., if differential multiplication 697-A between even-th pilot symbols and differential multiplication 697-B between odd-th pilot symbols are performed, a long PN scrambling code ID can be detected regardless of whether the number of transmission antennas used in the current base station is 1 or 2. In order to reduce complexity, Equation 12 can be replaced by Equation 15 by using only the even-th pilot symbol and ignoring the odd-th pilot symbol.

$$\sum_{i=0}^{\frac{N_P}{4}-1} \{(X(4i)(c_{g_k}(4i))^*)(X(4i+2)(c_{g_k}(4i+2))^*)^*\} \quad (15)$$

When the mobile station is turned on, an error of the clock generator 540 may be 3 pulses per million (PPM) or more. If this error is converted to a value used in a 2 GHz band, the error is 6 KHz or more. If a frequency offset is large in the initial cell search process, the search performance in the first step of the cell search process may be significantly decreased.

There is no performance problem in the second and third steps of the cell search process since frequency offset compensation is performed.

Figure 18:
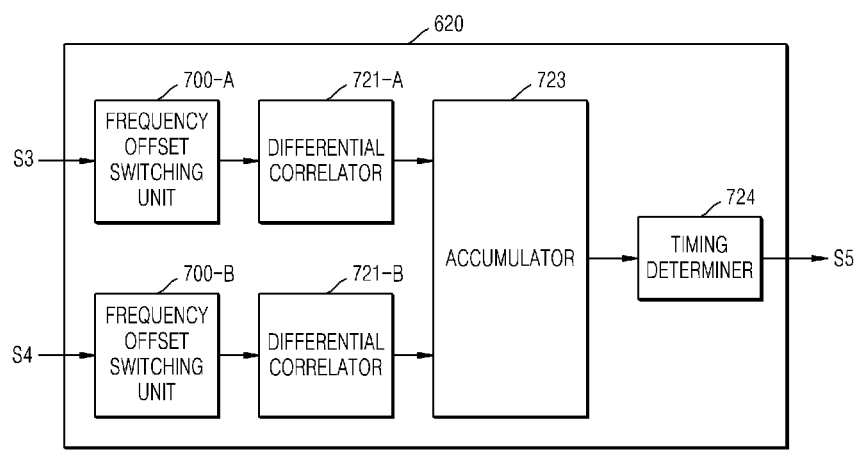
FIG. 18 is a block diagram of the sync acquirer of the receiver illustrated in FIG. 7, according to another embodiment of the present invention.

FIG. 18 is a block diagram of the sync acquirer 620 illustrated in FIG. 7, according to another embodiment of the present invention. Referring to FIG. 18, the sync acquirer 620 includes frequency offset switching units 700-A and 700-B, differential correlators 721-A and 721-B, an accumulator 723, and a timing determiner 724. Since functions and operations of the differential correlators 721-A and 721-B, the accumulator 723, and the timing determiner 724 are the same as those illustrated in FIG. 8, a detailed description thereof is omitted, and only the frequency offset switching units 700-A and 700-B will be described.

If a correlation operation handling absolute values is performed as in Equation 3 or 4, no frequency offset effect can be considered. However, if a correlation operation different from Equation 3 or 4 is performed, the frequency offset switching units 700-A and 700-B according to an embodiment of the present invention may be further included.

The frequency offset switching unit 700-A or 700-B multiplies an input signal r(n) by an arbitrary frequency offset component as in Equation 16, wherein a different offset value is used in every unit duration during the first step of the cell search process.

$$r'(n) = r(n) \times \exp\left\{-j2\pi \frac{\Delta f_s}{R_s} n\right\}, n = 0, 1, 2, \ldots \quad (16)$$

Figure 19:
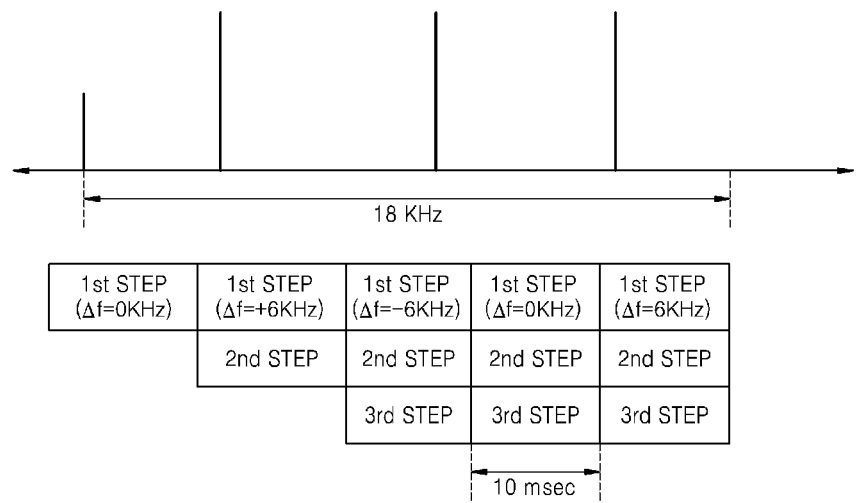
FIG. 19 is a conceptual diagram for explaining an operation of a frequency offset switching unit according to an embodiment of the present invention.

FIG. 19 is a conceptual diagram for explaining an operation of the frequency offset switching unit 700-A or 700-B illustrated in FIG. 18 according to an embodiment of the present invention.

The upper part of FIG. 19 illustrates frequency offset values 0 KHz, −6 KHz, and 6 KHz used in the frequency offset switching unit 700-A or 700-B. In this case, the sync acquirer 620 can safely operate even with an initial frequency offset of more than 18 KHz.

The lower part of FIG. 19 illustrates five cell search durations, wherein a frequency offset component used in the first step of the cell search process is illustrated in each cell search duration. Each cell search duration is 10 msec as shown in FIG. 19.

Figure 20:
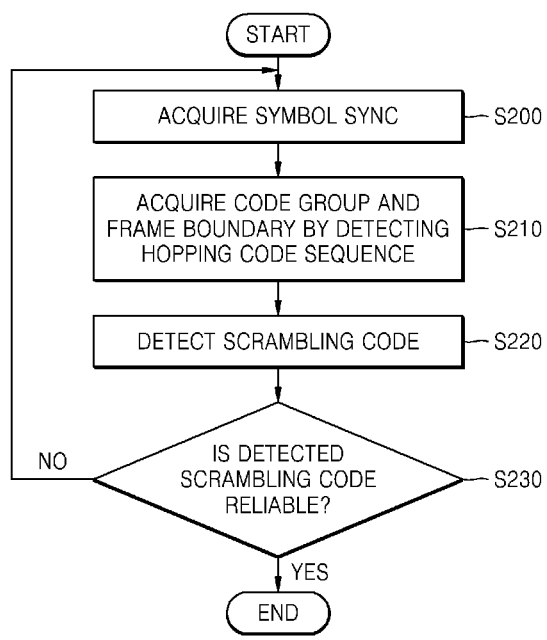
FIG. 20 is a flowchart illustrating a cell search method of a mobile station according to an embodiment of the present invention.

FIG. 20 is a flowchart illustrating a cell search method of a mobile station according to an embodiment of the present invention.

Referring to FIG. 20, the mobile station's cell search method according to the current embodiment includes operations sequentially processed by the cell search unit 600 illustrated in FIG. 7. Thus, although not fully described, the contents relating to the cell search unit 600 also apply to the cell search method according to the current embodiment.

The sync acquirer 620 acquires sync block synchronization using a sync channel symbol of a forward link in operation S200.

In operation S210, the group detector 640 detects a hopping codeword and a cyclic shift contained in a forward link frame based on the acquired synchronization and detects a code group to which a scrambling code of a current base station belongs and a frame boundary based on the detected hopping codeword and cyclic shift.

In operation S220, the code detector 680 detects the scrambling code based on the detected code group and a common pilot channel symbol.

In operation S230, it is determined whether the detected scrambling code is reliable, and if it is determined that the detected scrambling code is not reliable, the process returns to operation S200 and performs sync acquisition of a subsequent observing duration. If it is determined that the detected scrambling code is reliable, the detected scrambling code is considered to be a scrambling code of the home cell and the cell search process ends. A fine tuning operation for fine tuning frequency and timing can be further included after operation S230. A method of determining whether a correlation value used to detect the scrambling code is less than a predetermined threshold value can be used as a method of determining reliability.

If each code group includes only one scrambling code, the scrambling code can be detected in operation S210 since a hopping codeword respectively corresponds to a scrambling code. Thus, in this case, operation S220 can be omitted. If operation S220 is performed, the scrambling code detected in operation S220 is used for verification of the scrambling code detected in operation S210. That is, in this case, the scrambling code detected in operation S220 becomes a determination reference for determining reliability in operation S230. According to this method, if the two detected scrambling codes are different from each other, the process can return to operation S200 after operation S220.

Figure 21:
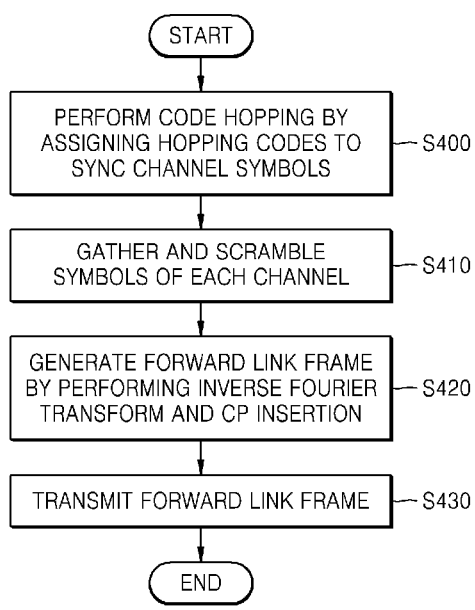
FIG. 21 is a flowchart illustrating a forward link frame transmission method of a base station according to an embodiment of the present invention.

FIG. 21 is a flowchart illustrating a forward link frame transmission method of a base station according to an embodiment of the present invention. Referring to FIG. 21, the base station's forward link frame transmission method according to the current embodiment includes operations sequentially processed by the blocks illustrated in FIG. 5. Thus, although not fully described, the contents described relating to the base station illustrated in FIG. 5 also apply to the forward link frame transmission method according to the current embodiment.

In operation S400, the sync channel generator 400 generates a hopping codeword specifying a code group to which a scrambling code of the base station belongs, and the OFDM symbol mappers 404-A and 404-B perform sync channel sequence hopping by assigning each element of the generated hopping codeword to each sync channel symbol. Simultaneously, data generated by the data channel generator 402 and the common pilot channel generator 401 is assigned to each position of the frequency domain by the OFDM symbol mappers 404-A and 404-B.

In operation S410, symbols that remain due to the exclusion of the sync channel symbols are scrambled in the frequency domain by the scramblers 405-A and 405-B.

In operation S420, a forward link frame is generated by performing inverse Fourier transformation on each sync channel symbol and scrambled remaining symbol in the inverse Fourier transformers 406-A and 406-B and inserting CPs into the forward link frame in the CP insertion units 407-A and 407-B.

In operation S430, the generated forward link frame is transmitted through an RF channel by the IF/RF units 408-A and 408-B.

As described above, according to the present invention, in an OFDM cellular system, a cell search time of a mobile station can be reduced, and a cell search unit operating with low complexity can be implemented. In addition, with only one sync channel, OFDM symbol synchronization, a long scrambling code group ID, and a frame boundary can be detected, and frequency offset estimation can be performed.

In addition, according to a sync acquisition method, synchronization can be acquired with low complexity.

In addition, in an OFDM cellular system in which base stations are in a sync mode, an adjacent cell search process can be efficiently performed, and thus handover can be smoothly performed, and battery consumption of a mobile station can be reduced.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cell search apparatus in an Orthogonal Frequency-Division Multiplexing (OFDM) cellular system in which a unique scrambling code is assigned to each cell, the cell search apparatus comprising:
    a sync acquirer acquiring synchronization of sync channel symbols using a sync channel of a forward link; and
    a group detector detecting at least one hopping codeword element belonging to a hopping codeword of a target cell from a forward link signal containing sync channel symbols sequence-hopped using the hopping codeword corresponding to a code group to which a scrambling code of the target cell belongs based on the acquired synchronization, and detecting the code group of the target cell based on the detected hopping codeword element,
    wherein the hopping codeword differs from a cyclically-shifted result of the hopping codeword, other hopping codewords used in the system, and cyclically-shifted results of the other hopping codewords.

2. The cell search apparatus of claim 1, wherein the sync acquirer acquires the symbol sync by calculating differential correlation values using a time domain repetition pattern of the sync channel symbols with respect to sample positions of the forward link signal in which elements of a sync channel sequence corresponding to elements of the hopping codeword of the target cell are assigned to odd-th or even-th subcarriers of a sync channel occupied band, and a predetermined value is assigned to the remaining subcarriers.

3. The cell search apparatus of claim 1, wherein the group detector detects a cyclic shift index of the hopping codeword from the detected hopping codeword element, and detects a frame boundary based on the detected cyclic shift index.

4. The cell search apparatus of claim 1, wherein the code group comprises a single scrambling code as an element,
    wherein the group detector detects the scrambling code of the detected code group as the scrambling code of the target cell.

5. The cell search apparatus of claim 1, wherein the forward link signal comprises at least one common pilot channel symbol scrambled using a scrambling code of each cell, the cell search apparatus further comprising a code detector calculating correlation values of scrambling codes belonging to the detected code group and the common pilot channel symbol and detecting the scrambling code of the target cell based on the detected correlation values.

6. The cell search apparatus of claim 5, wherein the code group comprises a single scrambling code as an element,
    wherein the group detector performs verification of a result of detection of the group detector by determining whether the detected scrambling code matches a scrambling code belonging to the code group detected by the group detector.

7. The cell search apparatus of claim 1, wherein the group detector detects the hopping codeword by detecting frequency offsets based on the sync channel symbols and compensating for the frequency offsets of the sync channel symbols.

8. The cell search apparatus of claim 1, wherein the group detector comprises:
    a code correlation calculator calculating a correlation value of the sync channel sequence used in the system and each of the sync channel symbols;
    a hopping code storage unit storing a plurality of hopping codewords;
    a codeword detector calculating a total sum of the calculated correlation values of a sync channel sequence corresponding to an element of each of the stored hopping codewords and all cyclically shifted codewords of the stored hopping codewords and detecting a hopping codeword of the sync channel symbols based on the result of the calculation; and
    a code group detector detecting the code group of the target cell based on the detected hopping codeword.

9. The cell search apparatus of claim 8, wherein the sync channel sequence is based on a Generalized Chirp Like (GCL) code,
    wherein the code correlation calculator comprises:
    a first data acquirer acquiring first data of a position of a subcarrier to which each element of the sync channel sequence is assigned at every timing of the sync channel symbols;
    a second data generator generating second data by multiplying a complex conjugate value of each first data by adjacent first data at every timing of the sync channel symbols; and
    a correlation generator performing inverse Fourier transformation on the second data at every timing of the sync channel symbols and generating the correlation value based on the inverse Fourier transformed value.

10. The cell search apparatus of claim 8, further comprising a frame boundary detector detecting the frame boundary based on the detected hopping codeword element.

11. The cell search apparatus of claim 5, wherein the group detector detects a frequency offset using the sync channel symbol, and
    the code detector performs frequency offset compensation of the common pilot channel symbol based on the detected frequency offset and performs the scrambling code detection.

12. The cell search apparatus of claim 5, wherein if the maximum value of the calculated correlation values is less than a predetermined threshold, the sync acquirer performs the sync acquisition again, the boundary detector performs the boundary detection and the code group detection again, and the code detector performs the scrambling code detection again.

13. A cell search apparatus in an Orthogonal Frequency-Division Multiplexing (OFDM) cellular system in which a unique scrambling code is assigned to each cell, the cell search apparatus comprising:
 a sync acquirer acquiring synchronization of sync channel symbols using a sync channel of a forward link; and
 a boundary detector detecting at least one hopping codeword element belonging to a hopping codeword of a target cell from a forward link signal containing sync channel symbols sequence-hopped using the hopping codeword based on the acquired synchronization, and detecting a frame boundary of the target cell based on the detected hopping codeword element,
 wherein the hopping codeword differs from a cyclically-shifted result of the hopping codeword, other hopping codewords used in the system, and cyclically-shifted results of the other hopping codewords.

14. A forward link frame transmission apparatus of a base station belonging to an Orthogonal Frequency-Division Multiplexing (OFDM) cellular system in which a unique scrambling code is assigned to each cell, the forward link frame transmission apparatus comprising:
 a sync channel generator generating sync channel sequences corresponding to elements of a hopping codeword corresponding to a code group to which a scrambling code of a base station belongs; and
 a frame transmitter performing sequence hopping of each sync channel symbol using each generated sync channel sequence, generating an OFDM symbol-based forward link frame containing the sequence-hopped sync channel symbols, and transmitting the generated forward link frame,
 wherein the hopping codeword used in the system differs from a cyclically-shifted result of the hopping codeword, other hopping codewords used in the system, and cyclically-shifted results of the other hopping codewords.

15. The forward link frame transmission apparatus of claim 14, wherein the frame transmitter assigns each element of the sync channel sequence to each of odd-th or even-th subcarriers of a sync channel occupied band, and assigns a predetermined value to each of the remaining subcarriers of the sync channel occupied band.

16. The forward link frame transmission apparatus of claim 14, wherein the sync channel generator generates as many sync channel sequences as the number of the sync channel symbols included in the forward link frame by dividing at least one code sequence.

17. The forward link frame transmission apparatus of claim 16, wherein the at least one code sequence is based on a Generalized Chirp Like (GCL) code.

18. The forward link frame transmission apparatus of claim 14, wherein the sync channel sequence is based on a GCL code.

19. The forward link frame transmission apparatus of claim 14, wherein the code group comprises only one scrambling code.

20. An Orthogonal Frequency-Division Multiplexing (OFDM) cellular system comprising a mobile station and a plurality of base stations, and in which a unique scrambling code is assigned to each cell,
 each of the plurality of base stations comprising:
  a sync channel generator generating a hopping codeword corresponding to a code group to which a scrambling code of the base station belongs and generating sync channel sequences corresponding to elements of the generated hopping codeword; and
  a frame transmitter performing sequence hopping of each sync channel symbol using each generated sync channel sequence, generating an OFDM symbol-based forward link frame containing the sequence-hopped sync channel symbols, and transmitting the generated forward link frame, and
 the mobile station comprising:
  a sync acquirer acquiring synchronization of sync channel symbols using a sync channel of a forward link; and
  a group detector detecting at least one hopping codeword element belonging to a hopping codeword of a target cell from a forward link signal containing sync channel symbols sequence-hopped using the hopping codeword of the target cell based on the acquired synchronization, and detecting a code group of the target cell based on the detected hopping codeword,
 wherein the detected hopping codeword differs from a cyclically-shifted result of the detected hopping codeword, other hopping codewords used in the system, and cyclically-shifted results of the other hopping codewords.

21. A cell search method in an Orthogonal Frequency-Division Multiplexing (OFDM) cellular system in which a unique scrambling code is assigned to each cell, the cell search method comprising:
 (a) acquiring synchronization sync channel symbols using a sync channel of a forward link; and
 (b) detecting at least one hopping codeword element belonging to a hopping codeword of a target cell from a forward link signal containing sync channel symbols sequence-hopped using the hopping codeword corresponding to a code group to which a scrambling code of the target cell belongs based on the acquired synchronization, and detecting the code group of the target cell based on the detected hopping codeword element,
 wherein the hopping codeword differs from a cyclically-shifted result of the hopping codeword, other hopping codewords used in the system, and cyclically-shifted results of the other hopping codewords.

22. The cell search method of claim 21, wherein operation (b) comprises detecting a cyclic shift index of the hopping codeword from the detected hopping codeword element and detecting a frame boundary based on the detected cyclic shift index.

23. The cell search method of claim 21, wherein the forward link signal comprises a common pilot channel symbol scrambled using the scrambling code, and
 (c) further comprising calculating correlation values of scrambling codes belonging to the detected code group and the common pilot channel symbol and detecting a scrambling code based on the detected correlation values.

24. The cell search method of claim 23, wherein the code group comprises a single scrambling code as an element,
 wherein operation (c) comprises determining whether the detected scrambling code matches a scrambling code belonging to the code group detected in operation (b), and if it is determined that the detected scrambling code does not match the scrambling code belonging to the code group, returning to operation (a).

25. The cell search method of claim 23, further comprising if the maximum value of the correlation values used in the scrambling code detection is less than a predetermined threshold, returning to operation (a).

26. A cell search method in an Orthogonal Frequency-Division Multiplexing (OFDM) cellular system in which a unique scrambling code is assigned to each cell, the cell search method comprising:
 (a) acquiring synchronization of sync channel symbols using a sync channel of a forward link; and
 (b) detecting at least one hopping codeword element belonging to a hopping codeword of a target cell from a forward link signal containing sync channel symbols sequence-hopped using the hopping codeword based on the acquired synchronization, and detecting a frame boundary of the target cell based on the detected hopping codeword element,
 wherein the hopping codeword differs from a cyclically-shifted result of the hopping codeword, other hopping codewords used in the system, and cyclically-shifted results of the other hopping codewords.

27. A forward link frame transmission method of a base station belonging to an Orthogonal Frequency-Division Multiplexing (OFDM) cellular system in which a unique scrambling code is assigned to each cell, the forward link frame transmission method comprising:
 (a) generating a hopping codeword corresponding to a code group to which a scrambling code of the base station belongs, and generating sync channel sequences corresponding to elements of the generated hopping codeword; and
 (b) performing sequence hopping of each sync channel symbol using each generated sync channel sequence, generating an OFDM symbol-based forward link frame containing the sequence-hopped sync channel symbols, and transmitting the generated forward link frame;
 wherein the hopping codeword differs from a cyclically-shifted result of the hopping codeword, other hopping codewords used in the system, and cyclically-shifted results of the other hopping codewords.

28. A non-transitory computer readable recording medium storing a computer readable program for executing the method of claim 21.

* * * * *